United States Patent [19]
Ema et al.

[11] Patent Number: 5,784,091
[45] Date of Patent: Jul. 21, 1998

[54] IMAGE FORMING SYSTEM USING DIGITAL ASIC AND ANALOG ASIC FOR PROCESSING IMAGE DATA AND CONTROLLING SEMICONDUCTOR LASER, AND HALF-TONE PIXEL REPRESENTING METHOD

[75] Inventors: Hidetoshi Ema, Yokohama; Masaaki Ishida, Sagamihara, both of Japan

[73] Assignee: Ricoh Company, Ltd., Tokyo, Japan

[21] Appl. No.: 862,326

[22] Filed: May 23, 1997

Related U.S. Application Data

[63] Continuation of Ser. No. 253,322, Jun. 3, 1994, abandoned.

[30] Foreign Application Priority Data

Jun. 4, 1993 [JP] Japan ................................. 5-160159

[51] Int. Cl.⁶ .......................... B41J 2/385; G03G 13/04; H04N 1/21
[52] U.S. Cl. .......................................... 347/131; 358/296
[58] Field of Search ........................... 358/296, 240, 358/251, 252, 253, 254; 347/131; 372/31, 38

[56] References Cited

U.S. PATENT DOCUMENTS

| 5,036,519 | 7/1991 | Ema et al. | 372/38 |
| 5,050,177 | 9/1991 | Ema | 372/38 |
| 5,138,623 | 8/1992 | Ema et al. | 372/38 |
| 5,237,579 | 8/1993 | Ema et al. | 372/38 |
| 5,258,780 | 11/1993 | Ema et al. | 347/131 |

FOREIGN PATENT DOCUMENTS

| 2-205086 | 8/1990 | Japan . |
| 5-67833 | 3/1993 | Japan . |

*Primary Examiner*—N. Le
*Assistant Examiner*—Raquel Yvette Gordon
*Attorney, Agent, or Firm*—Woodcock Washburn Kurtz Mackiewicz & Norris LLP

[57] ABSTRACT

A digital ASIC inputs pixel data thereto and an analog ASIC inputs the output signal of the digital ASIC thereto. A combination of the digital ASIC and the analog ASIC controls a semiconductor laser so as to pulse-width-modulate and amplitude-modulate the light emitted by the semiconductor laser that may be pulse-width-modulated and amplitude-modulated. The digital ASIC comprises a reference pulse generator having delay time control unit and a pulse width generator for generating a plurality of different pulse widths using pulses having a plurality of phases generated by the reference pulse generator. The analog ASIC comprises control/modulation unit for controlling the semiconductor laser so as to pulse-width-modulate and amplitude-modulate the light emitted by the semiconductor laser using the plurality of different pulse widths generated by the pulse width generator. The reference pulse generator comprises an oscillator comprising combined multiple delay-time control unit, and control unit for controlling the oscillator so as to make the frequency supplied by the oscillator identical to the clock of the pixel data.

26 Claims, 30 Drawing Sheets

FIG.2A CLK(CLOCK PULSE)
FIG.2B DATA 0 TO 7
FIG.2C POS CONT (POSITION CONTROL SIGNAL)
FIG.2D DOUT 0 TO 4 (DIGITAL OUTPUT)
FIG.2E WAVE FORM
FIG.2F PIXEL IMAGE

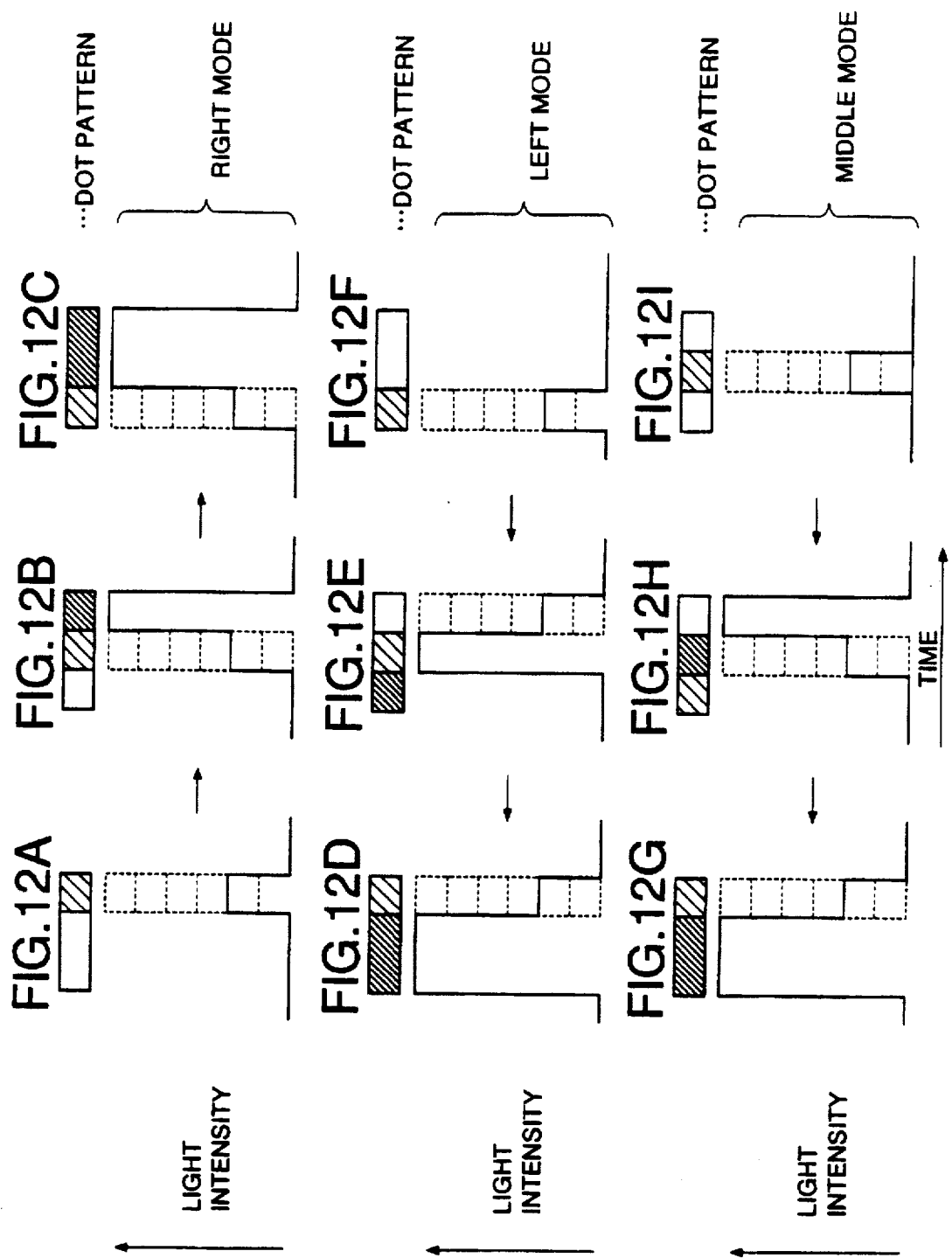

CURRENT CONTROLLING
CURRENT SOURCE $IPD = 0$              $(ILD < Ith)$
$IPD = m \times (ILD - Ith)$    $(ILD \geq Ith)$

IMAGE FORMING SYSTEM USING DIGITAL ASIC AND ANALOG ASIC FOR PROCESSING IMAGE DATA AND CONTROLLING SEMICONDUCTOR LASER, AND HALF-TONE PIXEL REPRESENTING METHOD

This is a continuation of application Ser. No. 08/253,322, filed Jun. 3, 1994 now abandoned.

BACKGROUND OF THE INVENTION

1. Field of the Invention

The present invention relates to an image forming system and a half-tone pixel representing method, and, in particular, relates to an image forming system including a semiconductor laser control unit for controlling light output by a semiconductor laser used as a light source in an apparatus such as a laser printer, optical disc apparatus, digital duplicator, optical communication apparatus or the like.

2. Related Art

Since a semiconductor laser can be very miniaturized and it is possible to modify the light output at high speed directly using a driving current, it has been widely used as a light source of a laser printer, optical disc apparatus, digital duplicator or the like, recently. However, since the relationship between a driving current and the light output in a semiconductor laser greatly depends on the temperature thereof, it is difficult to set the output light intensity of the semiconductor laser at a desired value. In order to eliminate such a problem in a semiconductor laser, various types of APC (automatic power control) units have been proposed.

Such APC units can be classified into the following three systems:

1) A system for controlling the output light as a desired value using a photoelectric negative feed back loop in which the output light is monitored by a photosensitive element, and then the forward directional current in the semiconductor laser is always controlled so that the signal, obtained by the photosensitive element, proportional to the photosensitive current (proportional to the output light of the semiconductor laser) may be equal to the light level instruction signal to be supplied to the semiconductor laser in amplitude;

2) a system for controlling the output light as a desired value in which:

the output light is monitored by a photosensitive element, and then the forward directional current in the semiconductor laser is always controlled so that the signal, obtained by the photosensitive element, proportional to the photosensitive current (proportional to the output light of the semiconductor laser) may be equal to the light level instruction signal to be supplied to the semiconductor laser in amplitude, in each power-setting period; and the forward directional current of the semiconductor laser set in the preceding power setting period is maintained in each non-power-setting period; and wherein, in the non-power-setting period, the set forward directional current is modified according to information so that the information may be carried by the output light; and 3) a system for controlling the output light as a desired value in which the temperature of the semiconductor laser is measured and the thus obtained temperature signal is used either to control the forward directional current in the semiconductor laser or to control the temperature of the semiconductor laser to be constant.

The above system 1) is preferable to obtain a desired value of output light from a semiconductor laser. However, limits present in the operation speed in the photosensitive-element, the operation speed of the amplifier element used in the photoelectric negative feed back loop, and so forth defines the control speed. Such a defined control speed will now be described. The upper limit of the control speed is defined by the open-loop cut-off frequency of the photoelectric negative feed back loop for example. If the cut-off frequency is assumed to be $f_0$, the semiconductor-laser output-light step response characteristics may be approximated as follows:

$$\text{Pout} = P_0 \{1 - \exp(-2\pi f_0 t)\};$$

where:

Pout is the output-light intensity of the semiconductor laser;

$P_0$ is the preset value for the output-light intensity of the semiconductor laser; and t is elapsed time.

In general use of semiconductor lasers, the entirety of the amount of light output by the semiconductor laser during the time period starting at a time at which the intensity of the output light of the semiconductor laser is changed and ending at the time after a predetermined time $\tau_0$ has elapsed from the above starting time is required. The above entirety of the amount of light is the integrated value $$\int \text{Pout} \cdot dt.$$

This entirety of the amount of light is expressed by the following expression.

$$\int \text{Pout} \cdot dt = P_0 \cdot t_0 \left\{ 1 - \frac{1}{2\pi f_0 t_0} [1 - \exp(-2\pi f_0 t_0)] \right\}$$

If $\tau_0$ is assumed to be 50 ns, $f_0$ should be more than 800 MHz if the allowable error is within 0.4%. This frequency condition is very difficult to be realized.

If the above system 2) is used, the above problem occurring in the system 1) does not occur and high-speed semiconductor-laser output-light modulation is possible. Thus, the system 2) is mostly used. However, the system 2) does not always monitor the output-light intensity of the semiconductor laser as mentioned above, and the undesirable semiconductor-laser output-light-intensity variation may likely occur due to disturbance such as that due to the DO loop characteristics of the semiconductor laser. The output-light intensity of the semiconductor laser likely includes an error such as that of several % due to the DO loop characteristics. In order to reduce such an error due to the DO loop characteristics, a method to compensate the thermal time constant of the semiconductor using the frequency characteristics of the semiconductor-laser driving current has been proposed. However, the thermal time constants of semiconductor lasers are different among the products and also different depending on the ambient environments. Further, another problem may be present when a semiconductor laser is used in an optical disc apparatus and so forth. That is, the amount of light varies under the influence of a semiconductor-laser returned light.

In order to solve problems such as those of amount of light/intensity variation, a semiconductor-laser control system is disclosed in Japanese Laid-Open Patent Application No.2-205086. In this system, a photoelectric negative feed-back loop is used, and in the loop, the output-light intensity of the semiconductor laser is monitored by a photosensitive element. Then, using the output signal resulting from the monitoring, the forward directional current in the semiconductor laser is always controlled so that the output signal may be equal to the light-emission level instruction signal to the semiconductor laser in amplitude. The above system further includes converting means for converting the value of the light-emission level instruction signal into the value of the forward directional current of the semiconductor laser. The system then controls the light-output intensity of the semiconductor laser using the sum or the difference in amplitude between the control signal of the photoelectric negative feed-back loop and the value produced by the converting means. Further, another semiconductor-laser control system is disclosed in Japanese Laid-Open Patent Application No.5-67833. By applying the above system, a construction such as that described above may be integrated, that is, a photoelectric negative feed-back loop may be easily designed and easily integrated.

However, the above described systems are those mainly for a limited scope of construction of output-light control of the semiconductor laser and do not include provision for directly handling digital pixel data. If a semiconductor-laser output-light control system is used in an apparatus such as a laser printer, a digital duplicator or the like using a semiconductor laser as the light source, a semiconductor-laser output-light control system is needed which can directly handle digital pixel data.

SUMMARY OF THE INVENTION

An object of the present invention is to facilitate pulse-widths production by forming an appropriate electrical circuit unit as a C-MOS(complementary metaloxide semiconductor)-device IC and to facilitate a photoelectric negative feed-back loop design by forming an appropriate electrical circuit unit as a a bipolar-device IC. Further, the object of the present invention includes one to provide an image forming system including a control system for controlling a semiconductor laser as the light source of a laser printer, digital duplicator or the like, by providing means for effectively connecting among the above two ICs and the semiconductor laser and method for examining the system.

To achieve the object of the present invention, an image forming system according to the present invention comprises:

a digital ASIC for inputting pixel data thereto; and an analog ASIC for inputting the output signal of said digital ASIC thereto;

and wherein combination of said digital ASIC and said analog ASIC controls a semiconductor laser so as to pulse-width-modulate and amplitude-modulate the light emitted by said semiconductor laser.

It is preferable that:

said digital ASIC comprises a reference pulse generator having delay time control means and a pulse width generator for generating a plurality of different pulse widths using pulses having a plurality of phases generated by said reference pulse generator; and said analog ASIC comprises control/modulation means for controlling said semiconductor laser so as to pulse-width-modulate and amplitude-modulate the light emitted by said semiconductor laser using the plurality of different pulse widths generated by said pulse width generator.

It is preferable that said reference pulse generator comprises:

an oscillator comprising combined multiple said delay-time control means; and control means for controlling said oscillator so as to make the frequency supplied by said oscillator identical to the clock of the pixel data.

By the above construction, both the construction for pulse-width modulation and the construction for amplitude modulation may be easily realized in comparison to the case where the two constructions are individually realized.

It is preferable that said digital ASIC comprises:

a pulse width generator for generating a plurality of different pulse widths using pulses, having a plurality of phases, generated by a reference pulse generator; and changing means for changing output timings of pulses, included in an output signal, with respect to the clocks of the pixel data;

and wherein:

said digital ASIC receives the pixel data and a position control signal as its input data and outputs the output signal indicating pulse-width modulation instructions, pulse amplitude modulation instructions and pulse generating timings;

the values represented by the output signal of said digital ASIC defines the amplitude of the light emitted by said semiconductor laser, the pulse widths represented by said output signal defines the pulse width of the light emitted by said semiconductor laser, and the pulse generating timings represented by said output signal defines the light emission timing of said semiconductor laser.

By the above construction, provision of light output, proportional to the input pixel data value, on a desired position in each dot pixel area is possible.

It is further preferable that:

said digital ASIC is a single chip including both said pulse width generator and a conversion table for converting the linearity of the pixel data; and said analog ASIC is another single chip including control/modulation means for controlling said semiconductor laser so as to pulse-width-modulate and amplitude-modulate the light emitted by said semiconductor laser using the plurality of different pulse widths generated by said pulse width generator.

Thus, miniaturization and cost saving is possible.

It is also preferable that:

said digital ASIC is formed of a CMOS transistor device; and said analog ASIC is formed of a bipolar transistor device.

Thus, it is possible to realize a high-speed and high-accuracy semiconductor-laser control/modulation unit.

It is preferable that said pulse width generator generates two pulses having different widths using most significant bits of the pixel data for each pixel and then generates pulses corresponding to the least significant bits of said pixel data using said two pulses having different widths, the difference in width between said two pulses corresponding to a portion of each pixel pulse, an amplitude of which portion is amplitude-modulated.

The width of the first of the above two pulses determines the time width for which the semiconductor laser outputs the light at the maximum power. The width difference between the two pulses determines the time width for which the semiconductor laser outputs the light with the amplitude-modulated power. The term 'amplitude modulation' refers to the 'semiconductor-laser output-light intensity modulation' and may be expressed as a term 'power modulation', hereinafter. Thus, it is possible to realize a construction for providing continuous light output, a portion of which has undergone the pulse-width modulation and the remaining portion of which has undergone the power modulation.

It is preferable that said difference in the width between said two pulses having different widths is the same as a unit of delay time supplied by said delay time control means.

Thus, it is possible to obtain dot-concentrated type light output for each pixel so that reproduction characteristics may be improved if the system is used in an electrophotography apparatus. This is because most parts of the entirety of the input pixel data for each pixel is used in the semiconductor laser's outputting of the light at its maximum power for most of the time width in the entirety of the time for which the semiconductor laser outputs the light. The remaining part of the entirety of the input pixel data is then used in the semiconductor laser's outputting of the light in the power-modulated power for the remaining time width in the entirety of the time for which the semiconductor laser outputs the light.

It is preferable that the system comprises:
 first means for forming a continuous pixel pulse from the two pixel pulses obtained by the pulse-width-modulation and amplitude-modulation for adjacent two pixels of the pixel data by shifting the phases of said two pixel pulses; and
 second means for then processing the two portions of said two pixel pulses, each of said two portions corresponding to said difference in the widths, so that said continuous pixel pulse formed by said first means has a single portion corresponding to said difference.

Thus, it is possible to obtain dot-concentrated type light output for two pixels so that reproduction characteristics may be improved if the system is used in an electrophotography apparatus.

It is preferable that said second means adds the smaller amplitude of the two amplitudes of said two portions to the larger amplitude; and if the result of the addition exceeds the amplitude of the remaining portions of said pixel pulses other than said two portions, the two amplitudes of said two portions are controlled so that the portion originally having the smaller amplitude has the surplus amplitude and the other portion has the amplitude same as that of said remaining portions.

Thus, it is possible to obtain dot-concentrated type light output for two pixels so that reproduction characteristics may be improved if the system is used in an electrophotography apparatus. This is because the two power-modulated portions of the output-light time width for two pixels are reduced to be a single portion for the two pixels, the time for the single portion thus being half.

It is preferable that the system comprises position control means for selecting, using position control data input to said system other than the pixel data, one of four modes consisting of three modes for determining a position, from which the width of the pixel pulse extends in a time axis direction, to be the starting position, the middle position and the last position of each clock period of the pixel data, and one mode for processing the two portions of said two pixel pulses, each of said two portions corresponding to said difference in the widths, so that said continuous pixel pulse formed by said first means has a single portion corresponding to said difference.

Thus, the phase origin position from which the dot to be provided in the area (corresponding to the pixel clock period) of each pixel extends may be selected among the area starting position, area middle position and the area ending position. Further, the dot-concentrated light output for adjacent two pixels as mentioned above may also be produced.

It is preferable that the system comprises switching means for switching, according to the position control data, a table into a different table, said tables being used to converting the linearity of the pixel data.

Thus, the desired pixel tone linearity may be realized in the printed image to result for each mode determined by the position control data.

It is preferable that said control/modulation means comprises:
 a photosensitive element for monitoring the light output of said semiconductor laser;
 an inverted amplifier means for inverted amplifying the difference in level between the output signal of said photosensitive element and the light emission instruction signal controlling the light emission level of said semiconductor laser, said inverted amplifier means then driving said semiconductor laser; and
 means for canceling the offset current of said inverted amplifier means.

Thus, even if either the output signal of the photosensitive element or the light-emission level instruction signal is one of very small amount, it is possible to control/modulate the semiconductor-laser light output in high accuracy because the offset current in the inverted amplifier means is canceled.

It is preferable that said means for canceling the offset current of said inverted amplifier means uses a current mirror circuit for producing a current equal to the base current of a transistor which passes a current therethrough equal to the emitter current of the input transistor of said inverted amplifier, the thus generated current being then added to the base of said input transistor.

Thus, the means for canceling the offset current may be realized in a simple structure.

It is preferable that said control/modulation means comprises:
 a photosensitive element for monitoring the light output of said semiconductor laser;
 an inverted amplifier means for inverted amplifying the difference in level between the output signal of said photosensitive element and the light emission instruction signal controlling the light emission level of said semiconductor laser, said inverted amplifier means then driving said semiconductor laser;
 a current detector for detecting the variation amount in the output signal of said inverted amplifier means, the variation depending the light emission instruction signal;
 a first digital to analog converter for converting the data input to said control/modulation means into the corresponding analog data;
 a comparator for comparing the output of said current detector with the output of said first digital to analog converter;
 retaining means for retaining, in a predetermined timing, the output of said comparator;
 a timing generator for generating said predetermined timing;
 a second digital to analog converter for converting the input to said control/modulation means into the corresponding data in accordance with data stored in a memory;
 a current adder for outputting a current having an amplitude proportional to that of said light emission instruction signal, the proportion coefficient being determined using the output of said second digital to analog converter; and amplitude correction means for correcting the amplitude of the output of said first digital to analog converter together with correction of said light emission instruction signal, said correction of said light emission instruction signal being performed so as to make said signal match the characteristics of an image printing system.

Thus, it is possible to control/modulate the semiconductor-laser light output at high speed and high accuracy.

It is preferable that said amplitude correction means also corrects for the amplitude of the output of said second digital to analog converter together with correction of said light emission instruction signal and the correction of the output of said first digital to analog converter.

Thus, since the output signal of the second digital to analog converter is changed together with the maximum output level of the semiconductor laser for the purpose of the correction, it is possible to correct the semiconductor-laser light output in high accuracy without having any overshooting phenomenon of the light output.

It is possible that said control/modulation means comprises:

a photosensitive element for monitoring the light output of said semiconductor laser;

an inverted amplifier means, formed of a bipolar transistor device, for inverted amplifying the difference in level between the output signal of said photosensitive element and the light emission instruction signal controlling the light emission level of said semiconductor laser, said inverted amplifier means then driving said semiconductor laser;

means for canceling the offset current of said inverted amplifier means; and means for setting the amount of said offset current using a voltage supplied from outside through a resistor connected to said analog ASIC.

Thus, the offset current may be finely set as that of a desired value and also the system may be miniaturized and the cost of the system may be reduced.

It is preferable that the system comprises:

a monitoring means for monitoring the power source voltage of said analog ASIC; and a switching means for forcibly switching off the output of said digital ASIC according to the output of said monitoring means.

Thus, the semiconductor laser unexpectedly switching on when the system power is switched on or off can be prevented.

It is preferable that the power source of said semiconductor laser is also used as the power source of said analog ASIC via a voltage regulator and also a low-pass filter is provided at the input of said voltage regulator.

Thus, it is possible to differentiate in the set voltages between the power source of the semiconductor laser and that of the analog ASIC. Further, by making the starting-up speeds of both the power-source voltages identical through the low-pass filter, it can be prevented that the semiconductor laser is unexpectedly switched on when the system power is switched on or off.

It is preferable that said control/modulation means comprises:

a photosensitive element for monitoring the light output of said semiconductor laser;

an inverted amplifier means, formed of a bipolar transistor device, for inverted amplifying the difference in level between the output signal of said photosensitive element and the light emission instruction signal controlling the light emission level of said semiconductor laser, said inverted amplifier means then driving said semiconductor laser; and a resonance circuit, provided between the output terminal of said inverted amplifier means and said semiconductor laser, including a capacitor and an inductance formed of the lead of said capacitor.

Thus, it is possible to remove noise having a frequency identical to the resonance frequency of the resonance circuit.

It is preferable that said control/modulation means further comprises means for correcting the output amplitude of said second digital to analog converter using a signal supplied from outside of said analog ASIC.

Thus, even if the semiconductor-laser characteristics are different according to the time elapsing and/or the device-temperature variation, and/or among the device products, it is possible to obtain the optimum light waveforms by appropriately setting, in amount, the output current of the second digital to analog converter.

Other objects and further features of the present invention will become more apparent from the following detailed description when read in conjunction with the accompanying drawings.

BRIEF DESCRIPTION OF THE DRAWINGS

FIGS. 12A, 12B, 12C, 12D, 12E, 12F, 12G, 12H and 12I show light output waveforms for illustrating the pulse-width-light-intensity-combined method in conjunction with a position control function according to the present invention;

DESCRIPTION OF THE PREFERRED EMBODIMENTS

Figure 1:
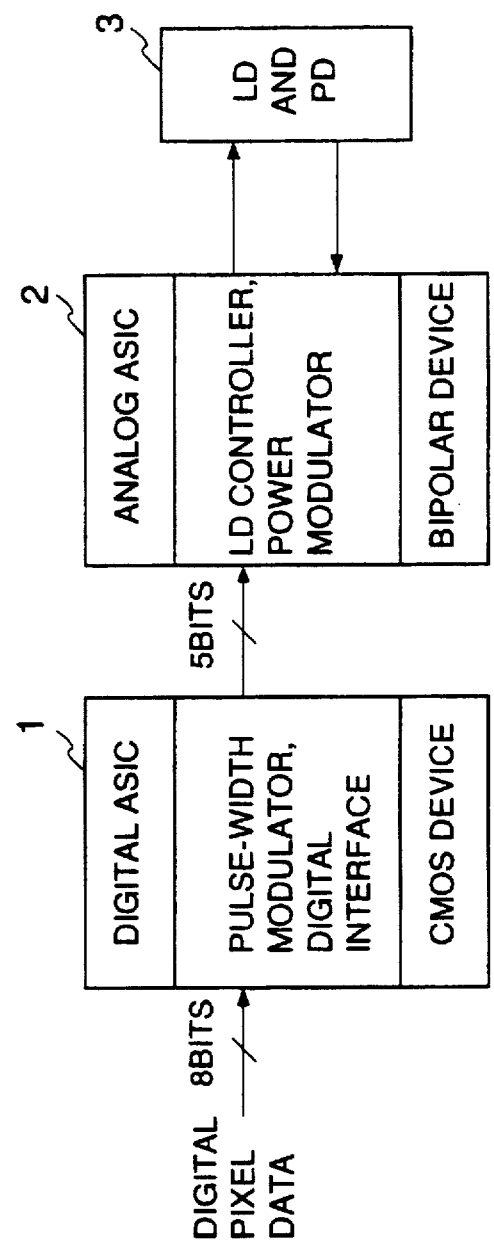
FIG. 1 shows a general block diagram of an image forming system in an embodiment of the present invention.

With reference to FIG. 1, an image forming system in one embodiment of the present invention is described. The system includes a digital ASIC (application specific integrated circuit) 1 formed of a CMOS device and including a pulse-width modulator and a digital interface also formed of a CMOS device. The system also includes an analog ASIC 2 formed of a bipolar transistor device and including an LD (laser diode) controller and a power modulator. The system also includes a unit 3 including an LD and a PD (photo diode).

8-bit digital pixel data DATA 0 through DATA 7 (such as that shown in FIG. 2B) and a 2-bit position control signal POS CONT (such as that shown in FIG. 2C) are input to the digital ASIC 1. The ASIC 1 then generates 5-bit output data DOUT 0 through DOUT 4 (the most significant bit is DOUT 4 and the least significant bit is DOUT 0 and may have value one of 0 through 31) indicating pulse-width modulation information and pulse generation timing information. The ASIC 1 supplies the output data DOUT 0 through DOUT 4 to the analog ASIC 2. The ASIC 2, in accordance with the thus input data DOUT 0 through DOUT 4, modulates the semiconductor laser (LD). The value represented by the data DOUT 0 through DOUT 4 determines the output light intensity of the semiconductor laser; the widths of the pulses DOUT 0 through DOUT 4 determine the pulse width of the output light of the semiconductor laser and the generation timing of the pulses DOUT 0 through DOUT 4 determines the light emission timing of the semiconductor laser, as described below, with reference to FIGS. 2A through 2F.

Figure 2:
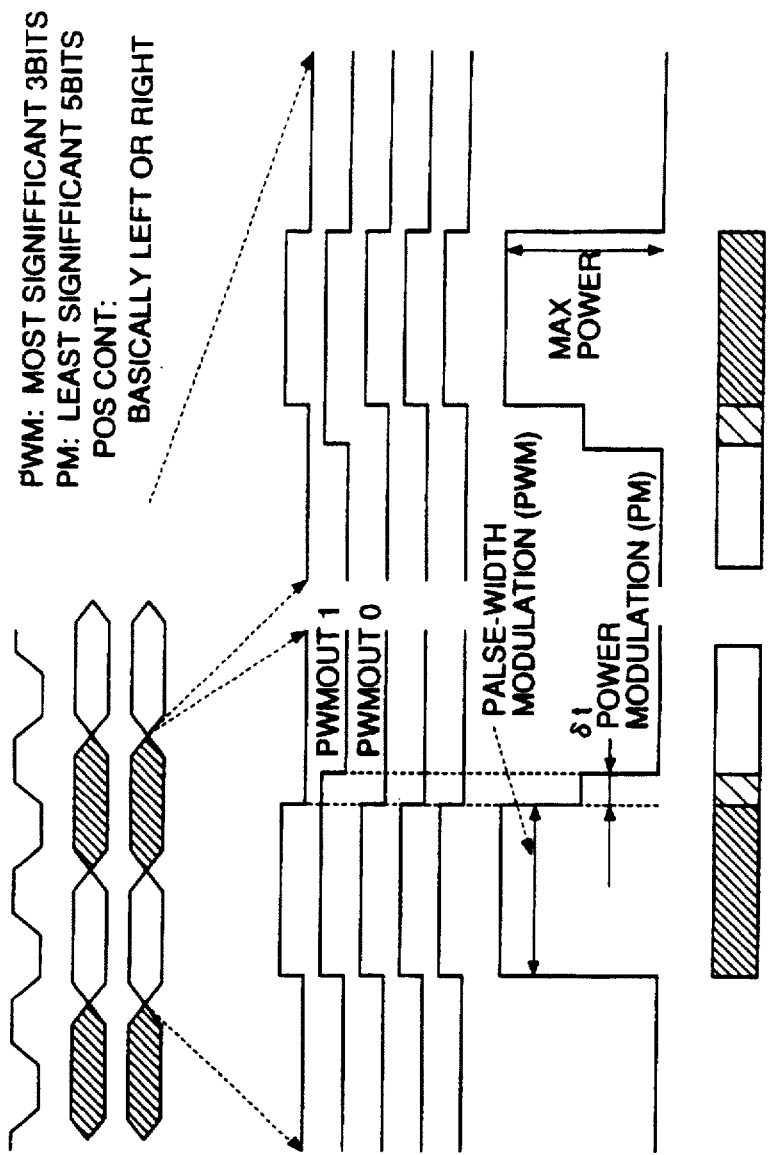
FIGS. 2A, 2B, 2C, 2D, 2E and 2F show signal waveforms and so forth for illustrating an example of operation of the image forming system according to the present invention.

FIG. 2A shows the clock pulses CLK with which the data DATA 0 through DATA 7 and the signal POS CONT are synchronized and supplied to the digital ASIC 1. FIG. 2E shows the light waveform generated by the analog ASIC 2 with the pulse-width modulation and the power modulation according to the data DOUT 0 through DOUT 4. FIG. 2F shows pixel images produced by the light, having the waveform shown in FIG. 2E, emitted by the semiconductor laser. In the example of FIGS. 2A through 2F, all the data DOUT 0 through DOUT 4 have the values of 'high' level for the period of pulse-width modulation (PWM), and only the second significant bit has the value of 'high' level and the remaining four bits have the values of 'low' level for the time period δt (the period of the power modulation (PM)), as shown in FIG. 2D. As a result, the semiconductor laser emits the light at the maximum intensity for the PWM period and at half the maximum intensity for the PM period as shown in FIG. 2E. Further, as shown in FIGS. 2E and 2F, the POS CONT signal determines the position of the light emission of the semiconductor laser, within the pixel period or pixel area, whether at the left (as shown at the left half of FIGS. 2D through 2F) or at the right (as shown at the right half of FIGS. 2D through 2F). Together with the difference in the light emission position, whether the time period δt is located after the PWM period (shown at the left half of FIGS. 2D through 2F) or before the PWM period (as shown at the right half of FIGS. 2D through 2F) is determined according to the POS CONT signal.

Although the example of FIGS. 2D through 2F indicates the cases of the left and right light emission positions within the pixel period or area, it is also possible to put the light emission position at the middle of the pixel area by putting the pulse generating timing of the data DOUT 0 through DOUT 4 at the middle with respect to the CLK signal. Thus, the POS CONT signal controls the position of a dot within the area of a pixel.

FIGS. 4A through 4F also show examples of light waveforms and dot images (pixel images) realizable in the present invention.

Detailed background of the structure shown in FIG. 1 will now be described.

A laser printer has been developed as a non-impact printer instead of a line printer for printing texts. However, it has been also examined to use a laser printer as an image printer because a laser printer has high-speed high-resolution characteristics. In this connection, various printing/recording technologies based on the dither method have been made practicable. Further, recent sharp development in semiconductor technology facilitates processing of a great amount of information. Thus, in the laser printer field, the single-dot multi-tone technology (each dot may be represented as that having a half tone among multiple tones) has been made practicable. Thus, a laser printer will have enough capability for acting as an image printer. However, there are various types of laser printers and thus they have various multi-tone capabilities. That is, a highest-level machine has a 8-bit-representable-value multi-tone capability for example while a lowest-level machine has a several-value multi-tone capability. The reason of such a characteristics variation is that it is costly to realize a more-finely-graded multi-tone capability because a more-finely-graded multi-tone capability requires processing of the corresponding amount of information and also requires the large-circuit-scale of semiconductor-laser control unit.

Figure 3:
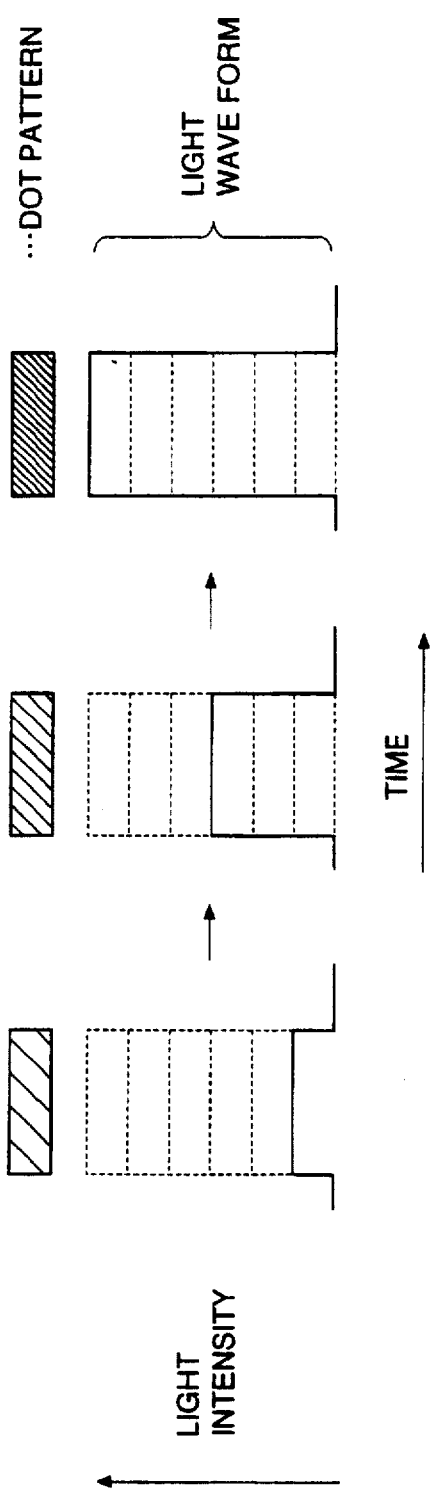
FIGS. 3A, 3B, 3C, 3D, 3E and 3F show light output waveforms for illustrating a light-intensity modulation method and a pulse-width modulation method principle which are used in the present invention.

The following two methods, 1) light-intensity modulation method (such as that illustrated in FIGS. 3A through 3C) and 2) pulse-width modulation method (such as that illustrated in FIG. 3D through 3F) have been proposed as a semiconductor-laser control/modulation method for providing single-dot multi-tone output.

b 1) Light-intensity modulation method:

As shown in FIGS. 3A through 3C, the output-light intensity level is controlled so as to obtain a desired tone for each pixel as shown as the dot patterns in the figures. Since this method uses a half-tone exposure range for achieving such a half-tone printing, it is necessary to stabilize a printing process with high accuracy. That is, a matter such as a developing-biasing voltage value should be stabilized in the printing process. However, a semiconductor-laser modulation process may be a relatively simple one and thus the device therefor may be realized as a simple and miniaturized one.

2) Pulse-width modulation method:

As shown in FIGS. 3D through 3F, only two levels are used as light intensity levels and the pulse width is controlled so as to control the light-emission time period for each pixel. A saturated exposure range is used so that a two-tone printing is used in the modulation process and a half-tone exposure range is used in the printing process. However, the duration of using a half-tone exposure range is reduced in comparison to the above described light-intensity modulation method. Further, as will be described, by coupling adjacent dots together, it is possible to further reduce the duration of using a half-tone exposure range. Thus, the importance of printing-process stability may be reduced. However, the semiconductor-laser control/modulation unit should be a complicated one for having a capability in which each pulse width can be controlled among different widths, the number of which is the values representable by 8 bits, and also adjacent dots can be coupled.

Summarizing the above, the light-intensity modulation method 1) requires highly-accurate printing-process stability and the pulse-width modulation method 2) requires complexity in the semiconductor-laser modulation unit. The present invention uses a pulse-width-light-intensity modulation method 3), a combination of both the methods 1) and 2), as described below.

Figure 4:
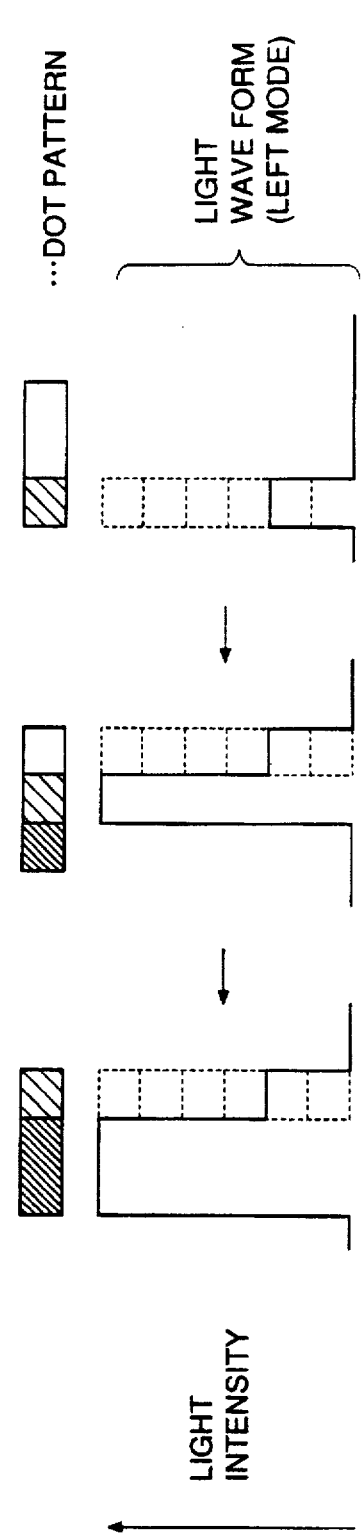
FIGS. 4A, 4B, 4C, 4D, 4E and 4F show examples of light output waveforms for illustrating a pulse-width-light-intensity-combined method according to the present invention.

3) Pulse-width-light-intensity modulation method:

As shown in FIGS. 4A through 4F, in particular in FIGS. 4B and 4E, light-intensity modulation is used to interpolate a pulse width and a subsequent pulse width. In an example, a pulse width may vary among 8 widths (corresponding to 3-bit tones) and a light intensity may vary among 32 intensities (corresponding to 5-bit tones). As a result, the 8-bit-tone (256-tone) modulation capability is obtained. In such a method, since the number of widths among which each pulse-width may vary is relatively small, the pulse width and pulse position may be easily set in a digital-data processing process.

Figure 5:
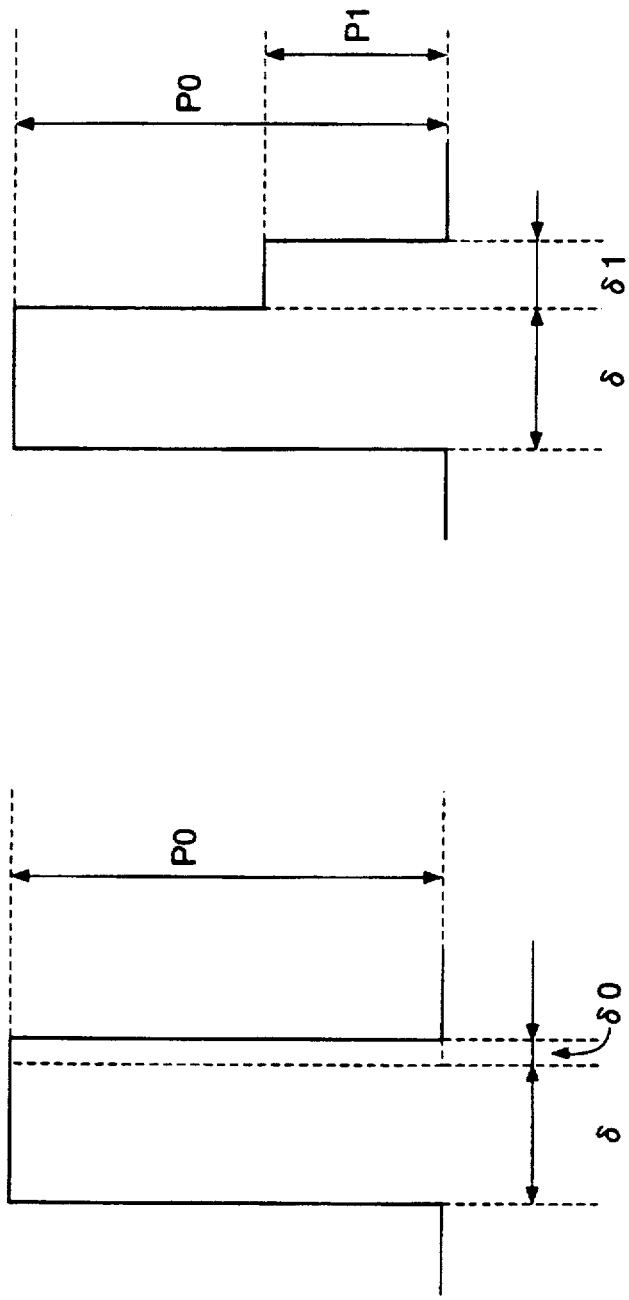
FIGS. 5A and 5B show examples of light output energy waveforms in the pulse-width modulation method and the pulse-width-light-intensity modulation method.

With reference to FIGS. 5A and 5B, the pulse-width-light-intensity modulation method is compared with the pulse-width modulation method in a point of exposure-energy amount.

For the above comparison, a laser beam spot made by light emission of a semiconductor laser is assumed to have Gaussian distribution and also it is assumed that the laser beam is scanned in the main scanning direction so that the laser beam is scanned in a single dimension.

The waveform resulting from the pulse-width modulation is assumed as that shown in FIG. 5A and the waveform resulting from the pulse-width-light-intensity modulation is assumed as that shown in FIG. 5B. The exposure distributions A(x) and B(x) for the cases of FIGS. 5A and 5B may be expressed by the following expressions:

A(x) is proportional to:

$$\int_0^{\delta+\delta 0} \exp[-\{(x-vt)/w\}^2]dt;$$

and B(x) is proportional to:

$$\frac{P_1}{P_0}\int_0^{\delta 1} \exp[-\{(x-vt)/w\}^2]dt + \int_0^{\delta} \exp[-\{(x-vt)/w\}^2]dt;$$

where:

the printing light-beam diameter is assumed as w;

the light-intensity levels are assumed as $P_0$ and $P_1$ as shown in FIGS. 5A and 5B;

the exposure times are assumed as $\delta$, $\delta 0$ and $\delta 1$; and the laser-beam scanning speed on the photosensitive-body surface is assumed as v.

Since A(x)<<1 if |x|>w, the case where |x|≦w is discussed hereinafter. In order to compare B(x) with A(x), the following value C(x) is examined:

$$C(x)=\{A(x)-B(x)\}/A(x).$$

Further, in order to make the exposure energy identical between A(x) and B(x), $(P_1/P_0)*\delta 1$ is assumed to be $\delta 0$. It is also assumed that $v*\delta 1<<w$. Then, the value C(x) is obtained as follows by expanding the expressions of C(x) for the terms $v*\delta 1/w$, $v*\delta 0/w$, the high order terms being neglected.

$$C(x)=(v*\delta 0/w)*(v*(\delta 0-\delta 1)/w)*D(x);$$

where $D(x)=(x+v*\delta)*\exp\{-((x+v*\delta)/w)^2\}/E(x)$;

where $E(x)=\exp\{-((x-t)/w)^2\}dt$.

Since D(x)≈1 if |x|≦w, $C(x)=(v*\delta 0/w)*(v*(\delta 0-\delta 1)/w)$. Thus, C(x) may be expressed by the quadratic expression for the term $v*\delta 1/w$.

In an example, if the printing density is assumed to be 400 dpi, the main-scanning-direction laser-beam diameter is assumed to be 40 μm, each dot having the dimension of 64 μm. Then, if the number of widths among which the pulse-width may vary is assumed to be the value 8, C(x)=0.01. That is, the difference in exposure-energy distribution between the pulse-width modulation and the pulse-width-light-intensity modulation is 1%. Consequently, it can be said that the exposure-energy distributions are identical between the pulse-width modulation and the pulse-width-light-intensity modulation if $v*\delta 0$ and $v*\delta 1$ is sufficiently smaller than the printing laser-beam diameter w.

Thus, the number of widths among which each pulse width may vary is assumed as the value 8 and the number of intensities among which each light intensity may vary is assumed as the value 32 as mentioned above.

A semiconductor-laser control method according to the present invention will now be described.

A light-intensity modulation such as mentioned above is achieved by using a photoelectric negative feed-back loop.

However, a simple photoelectric negative feed-back loop has problems in its modulation speed as described below.

The step response in a normal negative feed-back loop may be expressed by the following equation where the frequency at which the open-loop gain is 1 is referred to as $f_0$:

$$Pout=P_0*\{1-\exp(-2\pi f_0 t)\};$$

where Pout is the output-light intensity, $P_0$ is the preset value of the output-light intensity, and t is elapsing time. The time $\tau$ elapsing until $Pout=P_0*0.95$ is $$\tau=3/(2\pi f_0).$$

It should be that $f_0>100$ (MHz) if it is required that $\tau<5$ (ns). It is not easy to fulfill the above condition of $f_0$ because it is not easy to provide the photoelectric element for monitoring the semiconductor-laser output-light intensity and the other devices constituting the semiconductor-laser control unit having enough capabilities for fulfilling the above condition, due to the inevitable characteristics of such devices.

Figure 6:
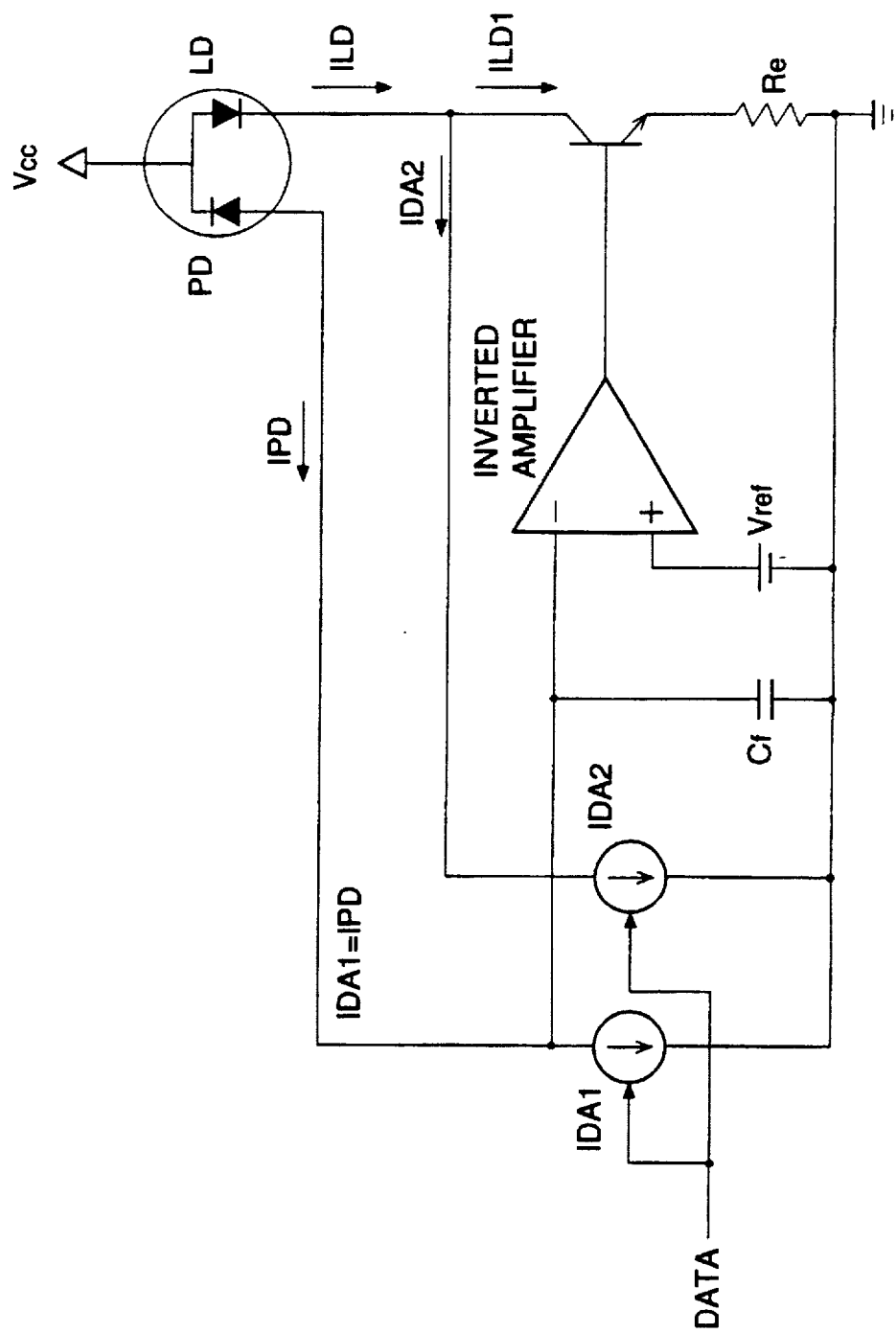
FIG. 6 shows a circuit equivalent to a semiconductor-laser control unit in an embodiment of the present invention.

As shown in FIG. 6, a semiconductor-laser control unit in an embodiment of the present invention uses a photoelectric negative feed-back loop. This feed-back loop includes a digital to analog converter IDA1 for converting a light-emission instruction signal (DATA) into the corresponding current IDA1 (=IPD). The feed-back loop also includes a negative (inverted) amplifier. The input terminal is connected with the converter IDA1 and the amplifier drives a transistor which drives the LD. A capacitor Cf and a resistor Re determine the control band of the above feed-back loop. The above semiconductor-laser control unit also uses a method which converts the light-emission instruction signal (DATA) into the current IDA2, through a digital to analog converter IDA2, for directly driving a semiconductor laser LD.

Figure 7A:
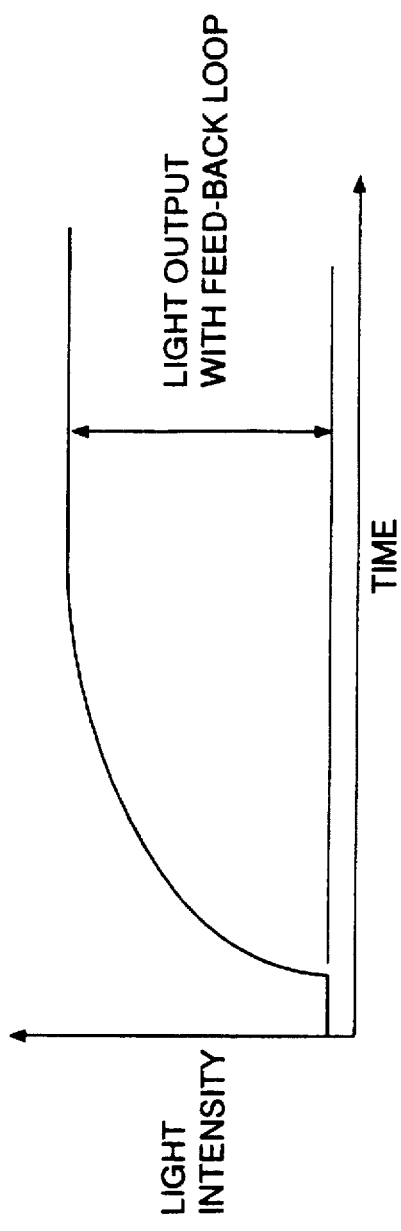
FIGS. 7A and 7B show light output waveforms for illustrating examples of operation of the construction shown in FIG. 6.
Figure 7B:
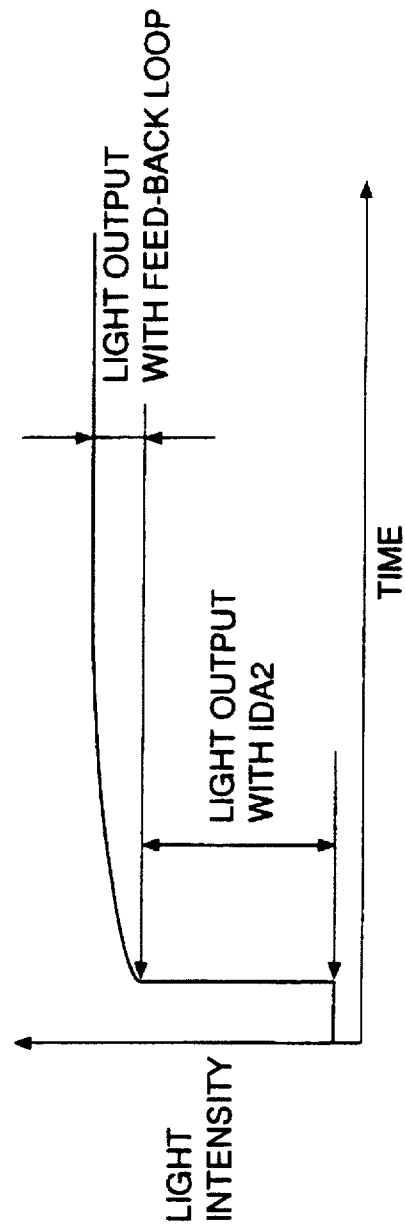

With reference to FIGS. 7A and 7B, the effect of the converter IDA2 will now be described. FIG. 7A shows the light-intensity step-response waveform where the IDA2 is not used and FIG. 7B shows the same where the IDA2 is used. Thus, the using of the IDA2 improves the step response as shown in the figures.

The step response of the unit shown in FIG. 6 may be expressed by the following equation:

$$Pout=P_0+(Ps-P_0)*\{1-\exp(-2\pi f_0 t)\};$$

where Ps is referred to the output-light intensity corresponding to the current which directly drives the semiconductor laser LD.

As shown in the above equation, in comparison to the above mentioned equation ($Pout=P_0*\{1-\exp(-2\pi f_0 t)\}$) for the case of using the normal feed-back loop, a relatively small value may be applied to the frequency $f_0$ by assuming $Ps \approx P_0$. Also, since errors in the value ($Ps-P_0$) can be restricted by the photoelectric negative feed-back loop, it is not necessary to make the Ps value setting accuracy high. Thus, using a method such as that using the circuit structure shown in FIG. 6 facilitates achievement of a semiconductor-laser control system which can modulate the semiconductor laser at high speed.

A pulse-width generation unit in an embodiment of the present invention will now be described.

Figure 8:
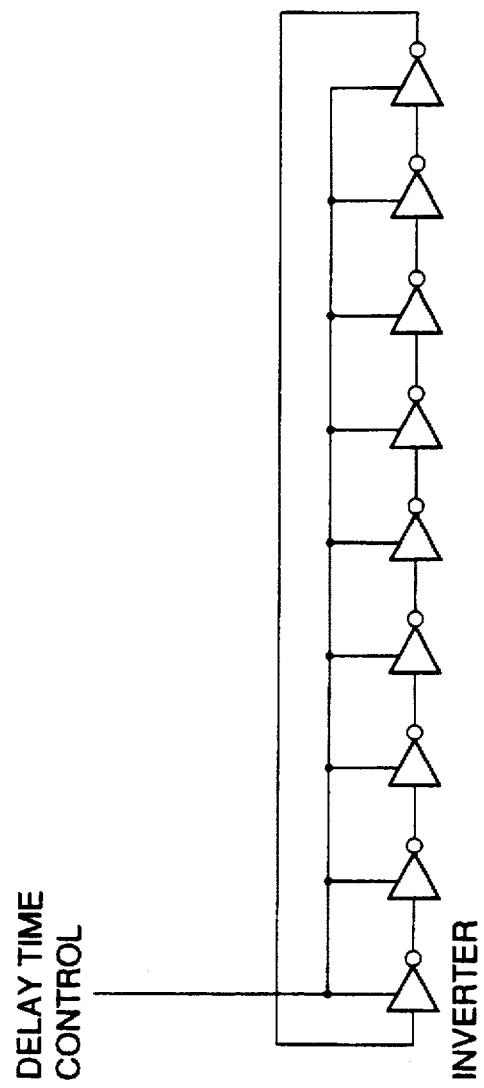
FIG. 8 shows a ring oscillator which may be used in the present invention.

The pulse-width generation unit may be realized using PLL (phase locked loop) technology using a ring oscillator, such as that shown in FIG. 8, as the base. The ring oscillator includes 9 stages of delay-time control type inverters as shown in the figure. The delay time of each inverter is ⅑ of a reference clock period T. The pulse-width generation system thus has the capability to generate 9 different pulse widths. The 8 different pulse widths, ⅑, ⅔, ..., ⅞ and ⅞, are used among the above 9 different pulse widths because the difference between the adjacent pulse widths is made fine in the range where the exposure energy is small.

The digital ASIC 1 shown in FIG. 1 acts as the above pulse-width generation unit and the analog ASIC 1 shown in the figure acts as the semiconductor-laser control and driving unit.

Figure 9:
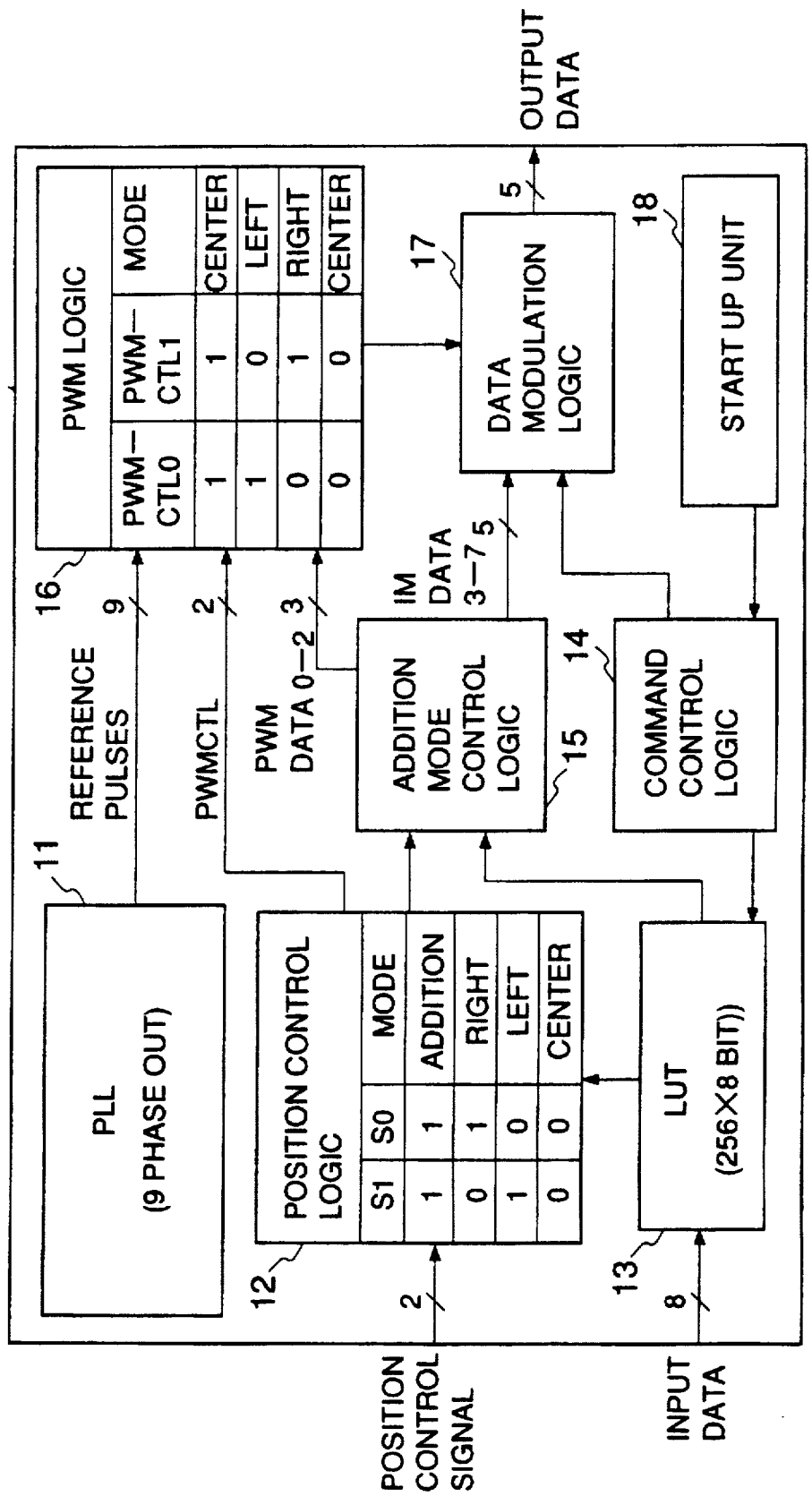
FIG. 9 shows a function block diagram of the digital ASIC shown in FIG. 1.

With reference to FIG. 9, a construction of the digital ASIC 1 will now be described. The ASIC 1 includes a reference pulse generator 11 including a PLL, a position control logic unit 12, a LUT (look up table) unit 13, a command control logic unit 14, addition mode control logic unit 15, a PWM logic unit 16, a data modulation logic unit 17 and a start up unit 18.

The LUT unit 13 is used to convert the linearity of the pixel data value so as to make the pixel data match the characteristics of the photosensitive body used in an image developing system so that the half tones represented by the pixel data may be appropriately reproduced in the image developing system.

Figure 10:
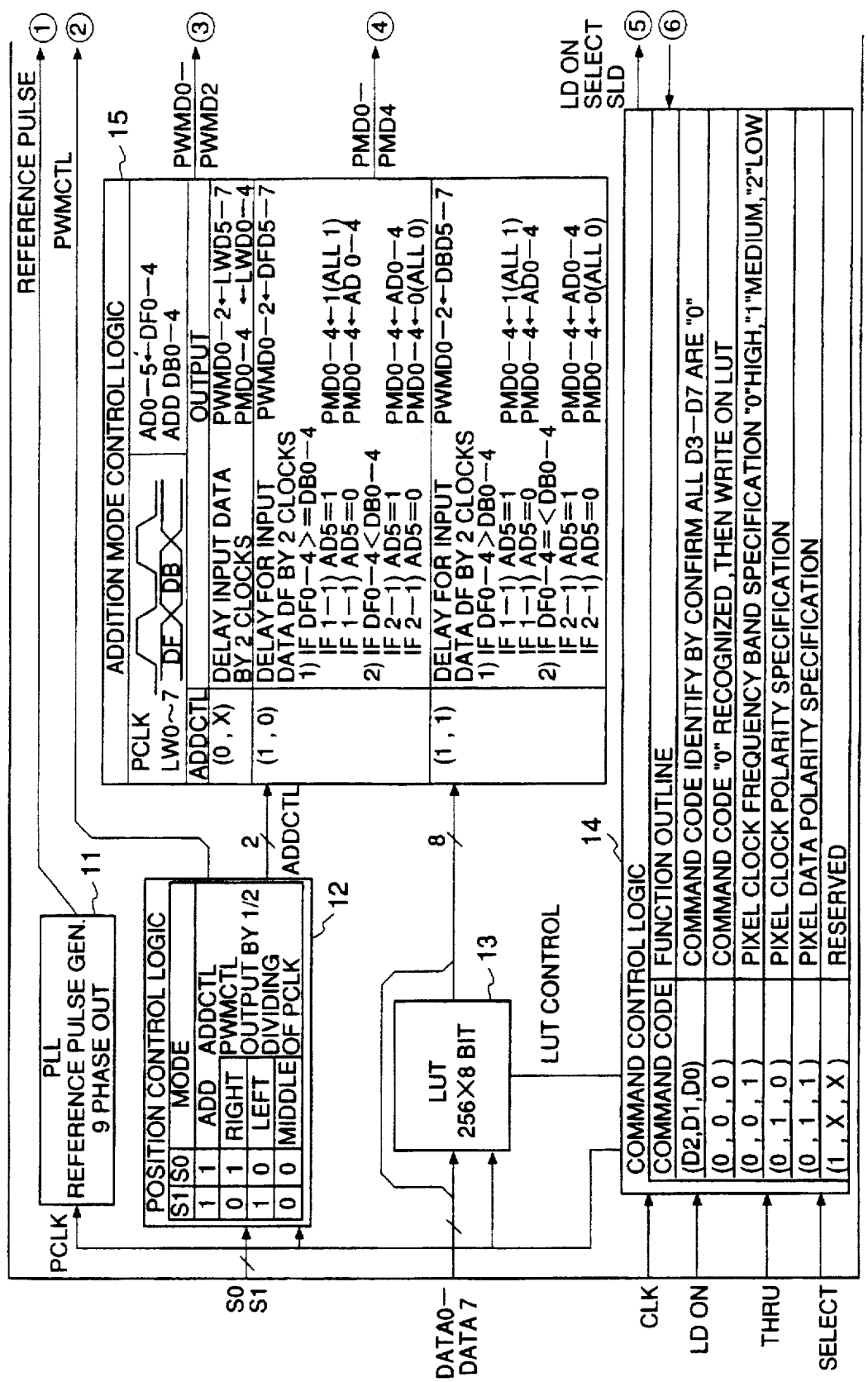
FIGS. 10 and 11 show details of the construction shown in FIG. 9.
Figure 11:
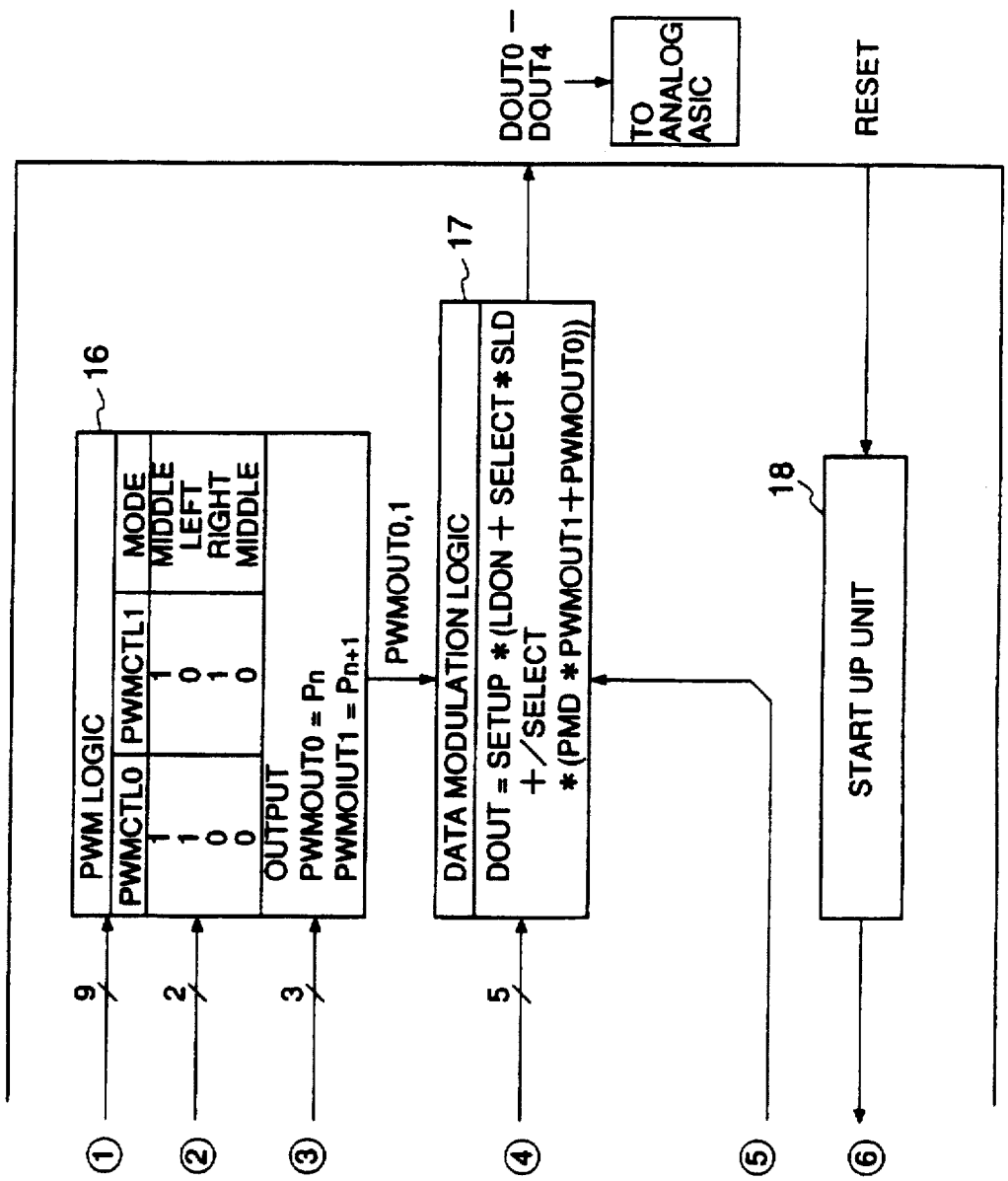

With reference to FIGS. 10 and 11, the construction shown in FIG. 9 will now be described in detail. Blocks in FIGS. 10 and 11 referred to as reference numerals same as those in FIG. 9 are the same blocks as those shown in FIG. 9.

The command control logic unit 14 determines, using the SELECT signal (referred to as SELECT in FIG. 10) whether the current mode is a command mode or a pixel data mode. If it is the command mode, the command control logic unit 14 recognizes the supplied data DATA 0 through DATA 7 as a command code. Then, the unit 14 executes the command indicated by the command code. Each command code used and the outlines of the functions to be executed by the command codes, as shown in FIG. 10, will now be described.

If it is determined that all the bits of the DATA 3 through DATA 7 are "0", among the input pixel DATA 0 through DATA 7 (may be referred to as D0 through D7), then the unit 14 determines that data to be received from then is command codes.

If it is determined that all the bits of the D2, D1 and D0 are "0", then the unit 13 writes the data which will be received from then to the LUT 13.

If it is determined that the (D2, D1 and D0) are (0, 0, and 1), the unit 14 determines that the coming data is that specifying the pixel clock frequency band. The data of the value "0" indicates that the band is a high one, the value "1" indicates that the band is a medium one, and value "2" indicates that the band is a low one.

If it is determined that the (D2, D1 and D0) are (0, 1, and 0), it is determined that the data is one for specifying the pixel clock polarity.

If it is determined that the (D2, D1 and D0) are (0, 1, and 1), it is determined that the data is one for specifying the pixel data polarity.

If it is determined that the (D2, D1 and D0) is (1, X, and X), it is determined that the data is reserved as it is. The symbol X means that either "0" or "1" may be substituted thereto.

The signal THRU indicates whether or not the unit LUT 13 will be passed by. If the LUT 13 is passed by, the input data DATA 0 through DATA 7 is transferred to the subsequent stage as it is. The LUT 13 acts to convert the linearity of the input data for the purpose of realizing the desired pixel tone linearity in the printed image to result. The position control logic unit 12, using the input signals S0, S1 and CLK, outputs signals ADDCTL and PWMCTL in order to set one the following modes as shown in FIG. 10:

If (S1, S0) is (1, 1), an addition mode as will be described is set;

if (S1, S0) is (0, 1), a right mode is set, in which a dot will be formed at the right side of the pixel area as shown in FIGS. 12A, 12B and 12C;

if (S1, S0) is (1, 0), a left mode is set, in which a dot will be formed at the left side of the pixel area as shown in FIGS. 12D, 12E and 12F; and if (S1, S0) is (0, 0), a middle mode is set, in which a dot will be formed at the middle of the pixel area as shown in FIG. 12G, 12H and 12I.

The reference pulse generator 11 which includes a PLL and uses the input CLK signal as the reference clock, generates clocks having nine phases as described above. The PLL includes VCO (voltage controlled oscillator) which is a ring oscillator as described above including nine stages of CMOS inverters. The generated reference pulses (clocks) are supplied to the pulse-width modulation logic unit 16.

Figures 13A, 13B, 13C:
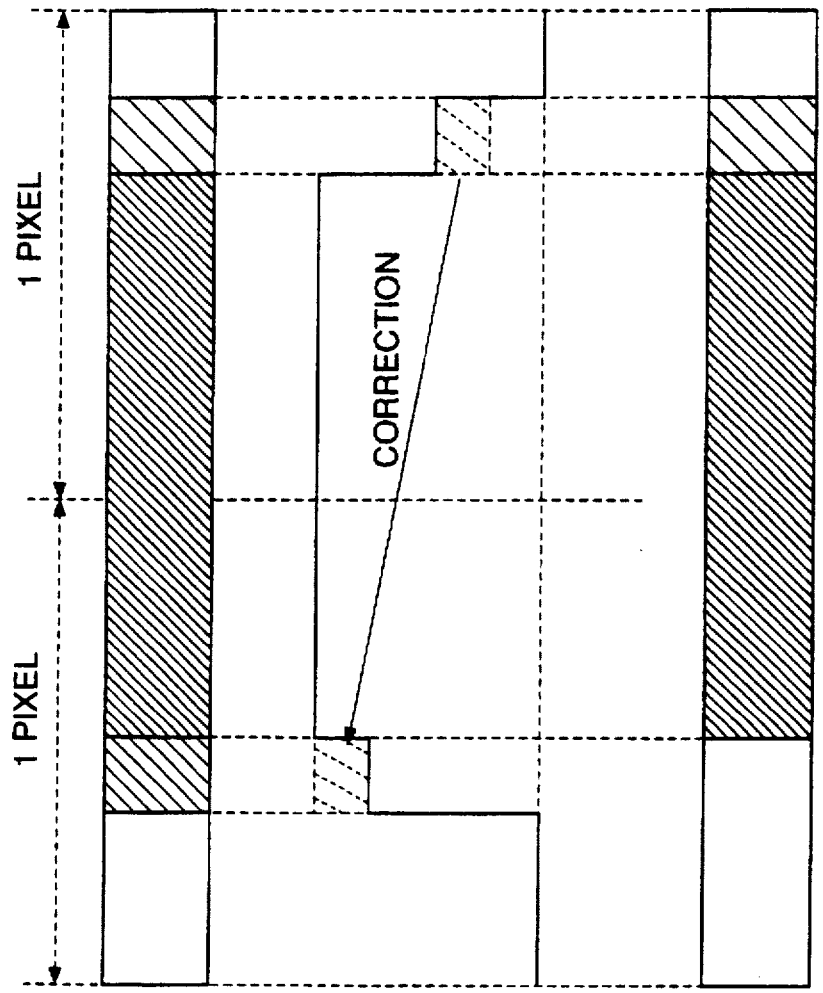
FIGS. 13A, 13B and 13C show dot images and light output waveform for illustrating an adding-mode function according to the present invention.

The addition-mode control logic unit 15 shown in FIG. 10 manipulates the supplied data, so as to execute the addition function as will be described with reference to FIGS. 13A, 13B and 13C, in accordance with the following logic as shown in FIG. 10:

The pixel clock signal PCLK is used to process the supplied data D0 through D7 which is substituted for LWD 0 through LWD 7. The five-bit data DF consists of the five-bit data D0 through D4 among the forward 8-bit data D0 through D7. The forward 8-bit data corresponding to a first pixel and the backward one mentioned below corresponding to a second pixel. In the current process, the first and second pixels are processed together so that the effect such as shown in FIGS. 13A, 13B and 13C may be obtained. The five-bit data DB consists of the five-bit data D0 through D4 among the 8-bit backward data D0 through D7. The above five-bit data DF is added to the above five-bit data DB and the result of the addition is then substituted for six-bit data AD 0 through AD 5.

If the above signal ADDCTL is (0, X), the input data LWD is delayed by two clocks. The data LWD 5 through LWD 7 is substituted for the data PWMD 0 through PWMD 2 which is then output. The data LWD 0 through LWD 4 is substituted for the data PMD 0 through PMD 4 which is then output.

If the above signal ADDCTL is (1, 0), the following 3-bit data PWMD 0 through PWMD 2 is output at the timing delayed from the timing of the input data DF by clocks. The data DF 5 through DF 7 is substituted for the data PWMD 0 through PWMD 2. 1) If the DF 0 through DF 4>DB 0 through DB 4, and then 1-1) if the AD 5=1, the "1" is substituted for the all bits of the PMD 0 through PMD 4. 1-2) If the AD 5=0, the data AD 0 through AD 4 is substituted for the data PMD 0 through PMD 4.

2) If the DF 0 through DF 4<DB 0 through DB 4, and then 2-1) if the AD 5=1, the data AD 0 through AD 4 is substituted for the data PMD 0 through PMD 4. 2-2) If the AD5=0, the "0" is substituted for the all bits of the PMD 0 through PMD 4.

If the above signal ADDCTL is (1, 1), the following 3-bit data PWMD 0 through PWMD 2 is output at the timing delayed from the timing of the input data DF by two clocks. The data DB 5 through DB 7 is substituted for the data PWMD 0 through PWMD 2. 1) If the DF 0 through DF 4>DB 0 through DB 4, and then 1-1) if the AD 5=1, the "1" is substituted for the all bits of the PMD 0 through PMD 4. 1-2) If the AD 5=0, the data AD 0 through AD 4 is substituted for the data PMD 0 through PMD 4.

2) If the DF 0 through DF 4≦DB 0 through DB 4, and then 2-1) if the AD 5=1, the data AD 0 through AD 4 is substituted for the data PMD 0 through PMD 4. 2-2) If the AD5=0, the "0" is substituted for the all bits of the PMD 0 through PMD 4.

The above mentioned addition mode will now be described with reference to FIGS. 13A, 13B and 13C. In the addition mode, waveforms are coupled for main-scan-line directionally adjacent two pixels as shown in FIG. 13B. In this case, the portions of the waveforms having the full intensity are positioned in the middle and the remaining portions having non-full intensities are positioned at the two sides as shown in the figure. As a result, there are two portions (non-full-intensity portions) which will undergo the light-intensity modulation. FIG. 13A shows the dot pattern resulting from the waveform shown in FIG. 13B. Then, the two portions are made to be a single portion as follows. A partial intensity (hatched area in the figure) of the portion having the smaller intensity (the right side one in the figure) is moved to the top of the portion having the larger intensity (the left side one in the figure) so that the latter portion has the full intensity as shown in the figure. Thus, there is a single portion (the right side) undergoing the light intensity modulation. FIG. 13C shows the dot pattern resulting from the thus manipulated (corrected) waveform. Thus, a value v*δ1 such as described with reference to FIG. 5B can be made significantly smaller than the writing beam diameter.

The data PWMD 0 through PWMD 2 resulting from the above manipulation and the PWMCTL signal are supplied to the pulse-width modulation logic unit 16 from the addition control logic unit 15 and then selects predetermined pulses from the reference pulse signals so as to produce data PWMOUT 0 and PWMOUT 1 being supplied to the data modulation logic unit 17. The data is the data PWMOUT 0 and PWMOUT 1 shown in FIG. 2D. The data PMD 0 through PMD 4 produced by the addition control logic unit 15 is processed in the data modulation logic unit 17 in accordance with the logic of the following equation so as to supply data DOUT 0 through DOUT 4:

DOUT=SETUP*(LDON+SELECT*SLD+/
SELECT*(PMD*PWMOUT1+PWMOUT0));

where the above signal SETUP is one which has the "1" value if the IC initializing has been finished; the above signal LDON (LD ON in FIG. 10) is one which has the "1" value so that the relevant data is output; and the above signal SLD is one which has the value "1" so as to indicate that the current mode is the data output mode.

Thus, the data DOUT 0 through DOUT 4 shown in FIG. 2D is generated.

Figure 14:
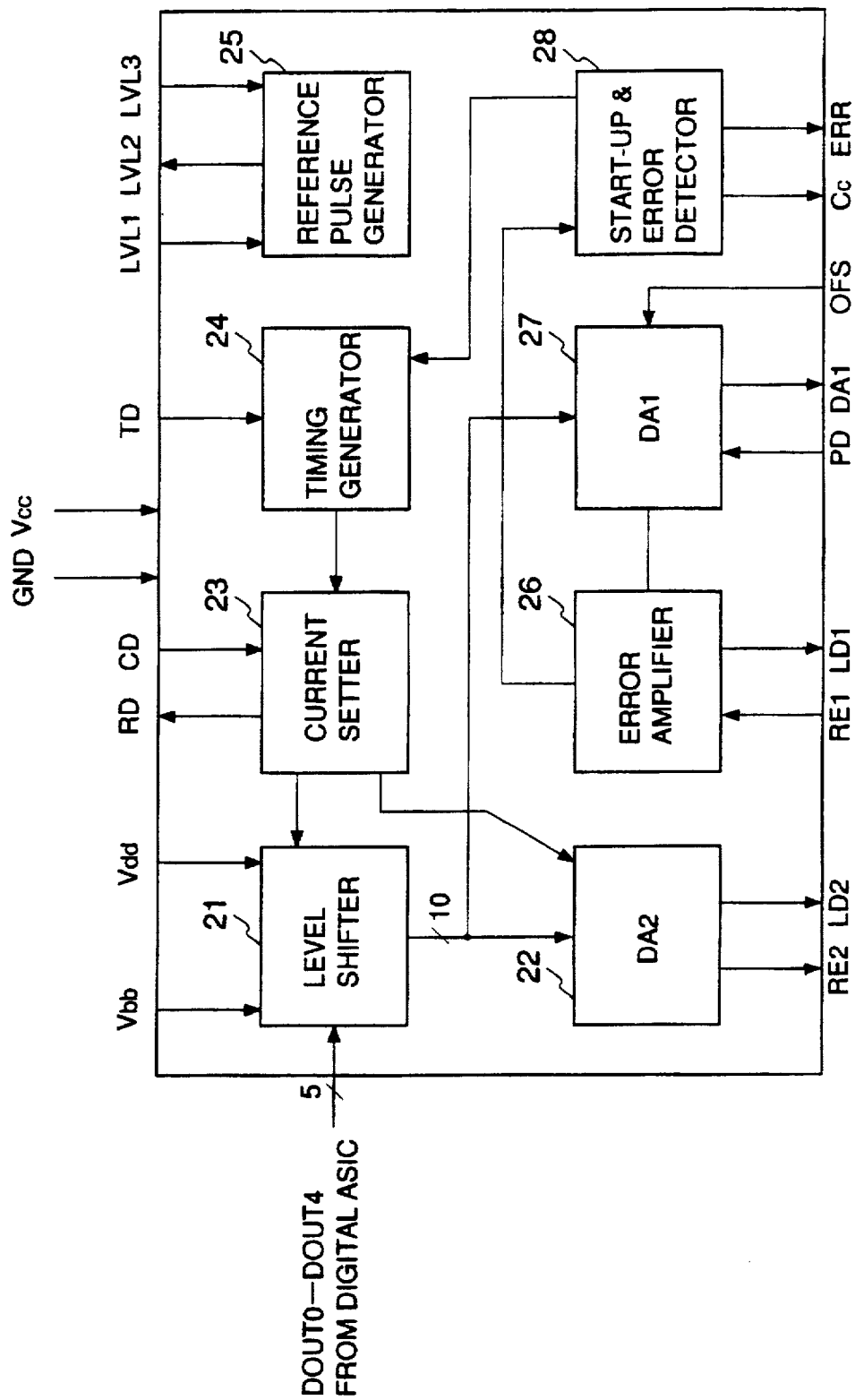
FIG. 14 shows a block diagram of the analog ASIC shown in FIG. 1.

With reference to FIG. 14, the analog ASIC 2 in an embodiment of the present invention will now be described. The analog ASIC 2 has a level shifter 21, a second digital to analog converter (DA2) 22, a current setter 23, a timing generator 24, a reference pulse generator 25, an error amplifier 26, a first digital to analog converter (DA1) 27, and a start-up and error detector 28.

The analog ASIC 2 converts the above supplied data DOUT 0 through DOUT 4 into the IC internal logical level signal and modulates the DA1 and DA2 using the converted signal in accordance with the supplied-signal inputting timing.

Figure 15:
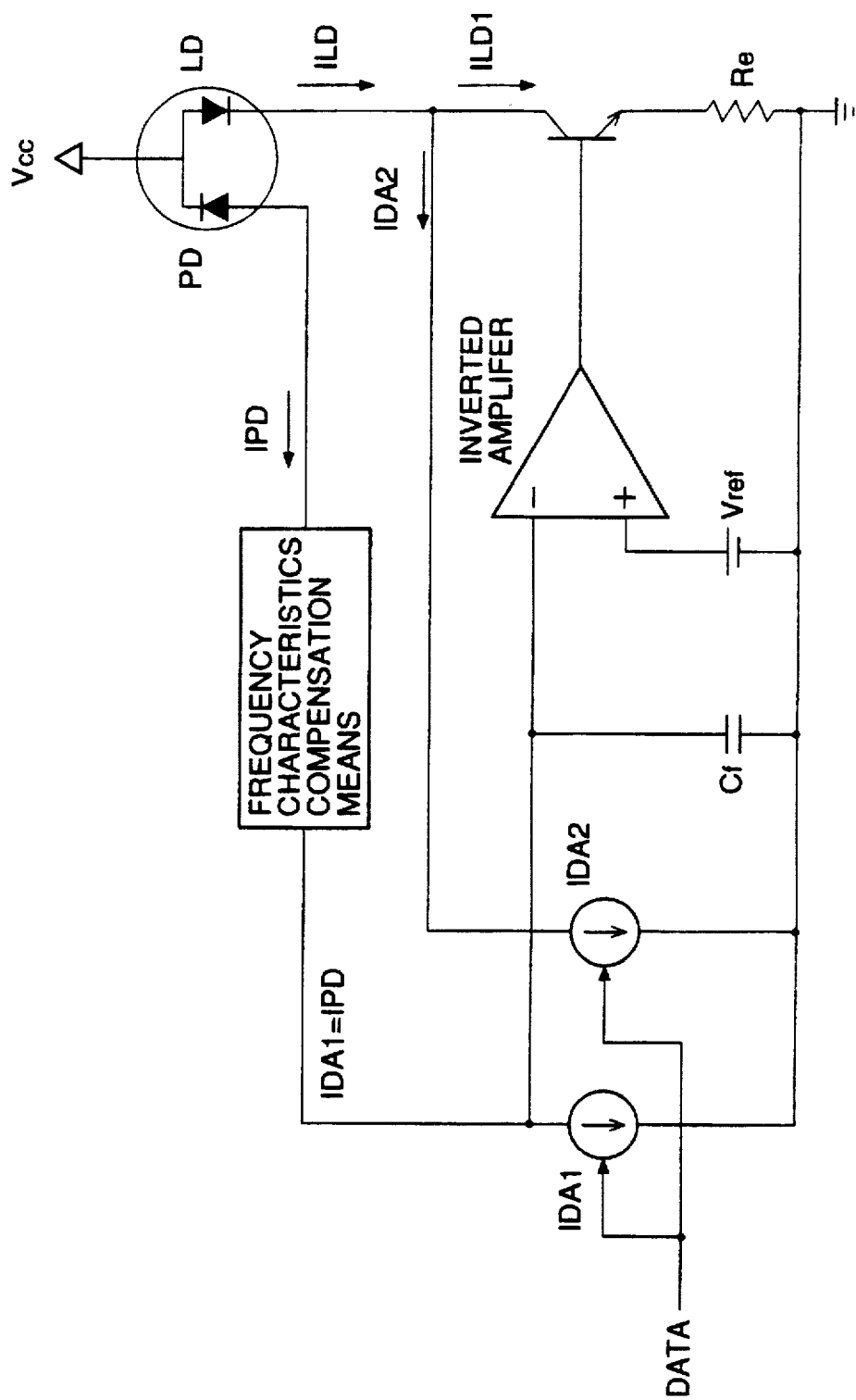
FIG. 15 shows a circuit equivalent to a semiconductor-laser control unit in another embodiment of the present invention.

With reference to FIG. 15, an operation in the analog ASIC 2 will now be described. The construction shown in FIG. 15 result from inserting frequency characteristics compensation means into the photoelectric negative feed-back loop of the construction shown in FIG. 6. The DA2 (IDA2) acts to add current so as to achieve light output having a step-like waveform as shown in FIG. 7B, and the DA2 acts as IDA2 in the construction of FIG. 6.

Thus, the digital ASIC 1 supplies the data DOUT 1 through DOUT 4 in an intermediate state 4 using the pixel data DATA 0 through DATA 7. The analog ASIC 2 uses the thus supplied data DOUT 1 through DOUT 4 so as to appropriately modulate the semiconductor laser LD and also acts as an optically printing system controlling the light intensity level so that the proper light intensity level may always be obtained.

Figure 16:
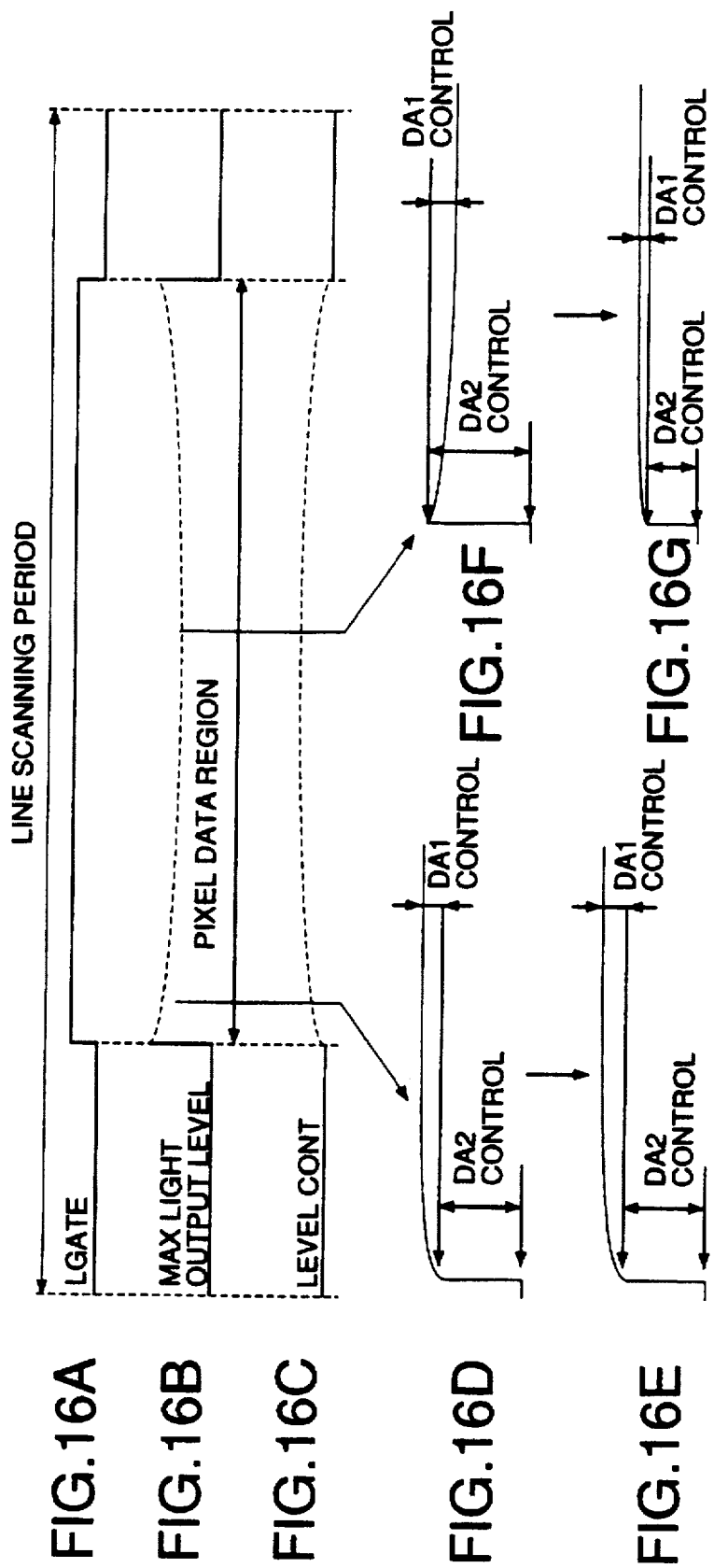
FIGS. 16A, 16B, 16C, 16D, 16E, 16F and 16G show signal waveforms and typical light output waveforms relating to the construction shown in FIG. 14 in principle.

It is commonly necessary in the case where such an optically printing system is used as a laser printer or the like to control the semiconductor-laser maximum output-light intensity level depending on variation of environment conditions such as ambient temperature, humidity, elapsed time and so forth. In particular, the maximum output-light intensity level is controlled so as to compensate variation in light-beam shape formed on a photosensitive body during a main scanning operation. Resetting of a preset full-scale (maximum) output level of the DA2 may be used for this purpose. The term 'full-scale (output) value (level)' used in the specification and claims of the present application is referred to a basic value (level) which is preset. In principle, a desired value (level) may be obtained by multiplying the relevant input data, indicating the ratio of the above desired value (level) and the above preset full-scale value (level), and the preset full-scale value (level) together. With reference to FIGS. 16A through 16G, an operation according to the present invention achieving a fine dot-shape (light-beam-shape) control made for the pixel data region within a line scanning period of a laser printer will now be described. FIGS. 16D and 16F show example of waveforms which result from a method in which the maximum output-light intensity level is controlled using only the controlling of the set level in the DA1 and the controlling of the set level in the DA2 is not used for this purpose. In this case, as shown in FIG. 16F, the overshooting phenomenon occurs at the beginning of the waveform at the middle of the pixel data region, the waveform being thus degraded. In contrast to this, as shown in FIGS. 16E and 16G, showing example of waveforms resulting from a method according to the present invention in which the set levels in the DA1 and DA2 are relationally controlled, the waveforms shown in the figures are similar between the end and the middle of the pixel data region. As a result, the present invention method can finely control dot shapes.

Figure 17:
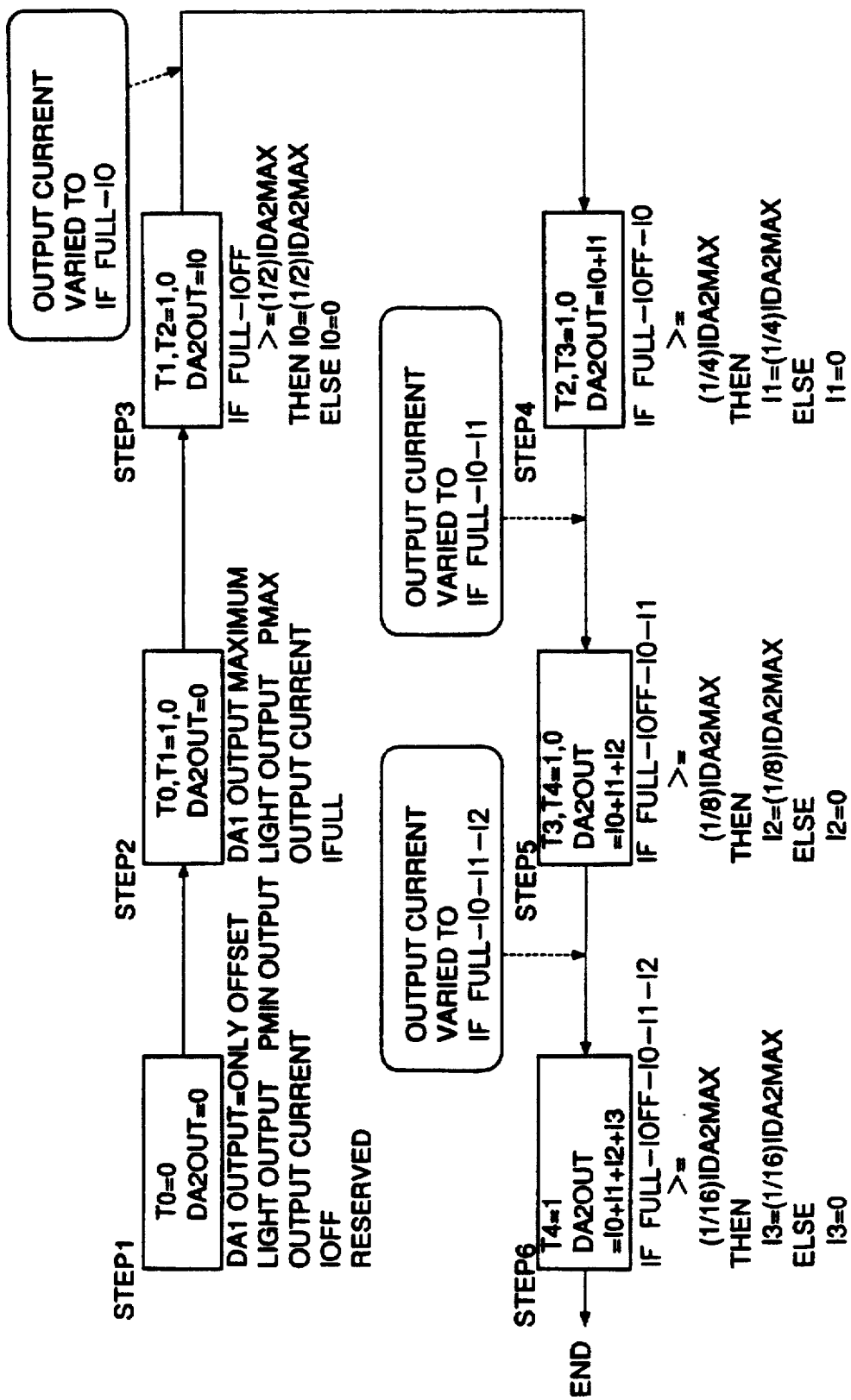
FIG. 17 shows an operation flow of a DA2 output-level setting method according to the present invention.
Figures 18A, 18B:
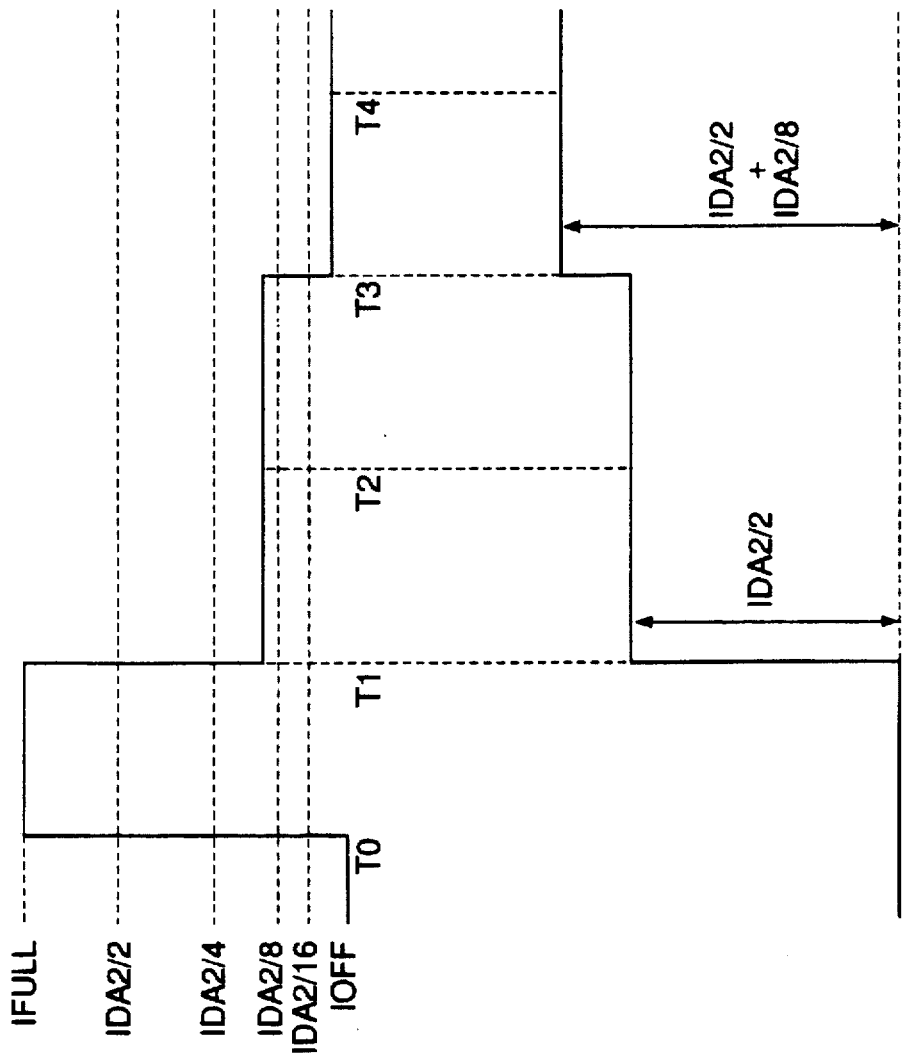
FIGS. 18A and 18B show current waveforms for illustrating the DA2 output-level setting method.

The above preset DA2 full-scale (maximum) output level is previously set in the above initializing process described below with reference to FIGS. 17, 18A and 18B. Signals T0, T1, T2, T3 and T4 are pulse signals which rise up sequentially in the order with a predetermined time interval at the respective times T0, T1, T2, T3 and T4. The relevant timing generation is realized as a result of the generation of these pulse signals. Thus, "T0, T1 are 1,0" means the time during the period in which T0≦t≦T1.

In a step 1, if the time T0=0 and the DA2 output is 0, the DA1 output is only the offset value IOFF. Thus, the light output P is the minimum one and the output current of the combination of the DA1 and DA2 functions is maintained as a value IOFF (the offset value, not zero in general, which value appears where the input value is zero).

The DA1 output is then one having the full-scale value indicating the LD emit in full-scale light output level.

In a step 2, during the time T0, T1 are 1, 0, the DA2 output is set as the value 0. Thus, the control current output should have solely the value causing the LD to emit the full-scale output due to the relevant corresponding instruction of DA1 as mentioned above. Thus, the control current output becomes one having the full-scale value IFULL.

In a step 3, during the time T1, T2 are 1, 0, the DA2 output is set as $I_0$, where if IFULL-IOFF≧(½)IDA2MAX (the DA2 device maximum output, that is, the maximum possible output in the capacity of the DA2 device), $I_0$=(½) IDA2MAX. If not, $I_0$=0. In the case of FIGS. 18A and 18B, since IFULL-IOFF≧(½)IDA2MAX, $I_0$=(½)IDA2MAX. Thus, the IDA2 becomes (½)IDA2MAX at the time T1 as shown in FIG. 18B.

Then, the control current output varies to have a value IFULL-$I_0$, since, at this time, the control current output and the IDA2 ($I_0$) together should have caused the LD to emit the full-scale output due to the above DA1 instruction. Then, in a step 4, during the time T2, T3=1, 0, the DA2 output is set as $I_0+I_1$, where if IFULL-IOFF-$I_0$≧(¼)IDA2MAX, the current $I_1$=(¼)IDA2MAX. If not, $I_1$=0. In the case of FIGS. 18A and 18B, IFULL-IOFF-$I_0$<(¼)IDA2MAX, thus, $I_1$=0. That is, the IDA2 does not vary between the T1–T2 period and T2–T3 period as shown in FIG. 18B.

Then, the control output current varies to have a value IFULL-$I_0$-$I_1$. Then, in a step 5, during the time T3, T4=1, 0, the DA2 output is set as $I_0+I_1+I_2$, where if IFULL-IOFF-$I_0$-$I_1$≧(⅛)IDA2MAX, the current $I_2$=(⅛)IDA2MAX. If not, $I_2$=0. In the case of FIGS. 18A and 18B, since IFULL-IOFF-$I_0$-$I_1$≧(⅛)IDA2MAX, the current $I_2$=(⅛)IDA2MAX. Thus, the IDA2 rises up by (⅛)IDA2MAX as shown in FIG. 18B.

Then, the control output current varies to have a value IFULL-$I_0$-$I_2$. Then, in a step 6, during the time T4=1, the DA2 output is set as $I_0+I_1+I_2+I_3$, where if IFULL-IOFF-$I_0$-$I_1$-$I_2$≧(1/16)IDA2MAX, the current $I_3$=(1/16)IDA2MAX. If not, $I_3$=0.

Thus, the four-bit data $I_0+I_1+I_2+I_3$ is set in the initializing process. In the process, the DA1 output level is first made to be the full-scale output level and the output level of the DA1 is sequentially compared with respective parts, that is, the half, ¼, ⅛ and 1/16 of the DA2 device maximum output level. During the above process, if the DA1 output level is larger than a respective part of the DA2 device maximum output level, the respective part is added to the current temporary four-bit data (which is zero at first). Thus, the full-scale output level of the DA2 is preset as the thus determined four-bit data which is stored in a DA4 which will be described. In the actual operation of the laser printer, the thus set full-scale output level of the DA2 is used to make the LD emit a desired intensity level of light output. A desired level may be obtained using both the full-scale output level and relevant input data indicating the ratio of the desired level and the full-scale level. By using the full-scale output level of the DA2, a step-like high-speed response such as shown in FIG. 7B can be obtained as mentioned above with reference to the figure.

Figure 19:
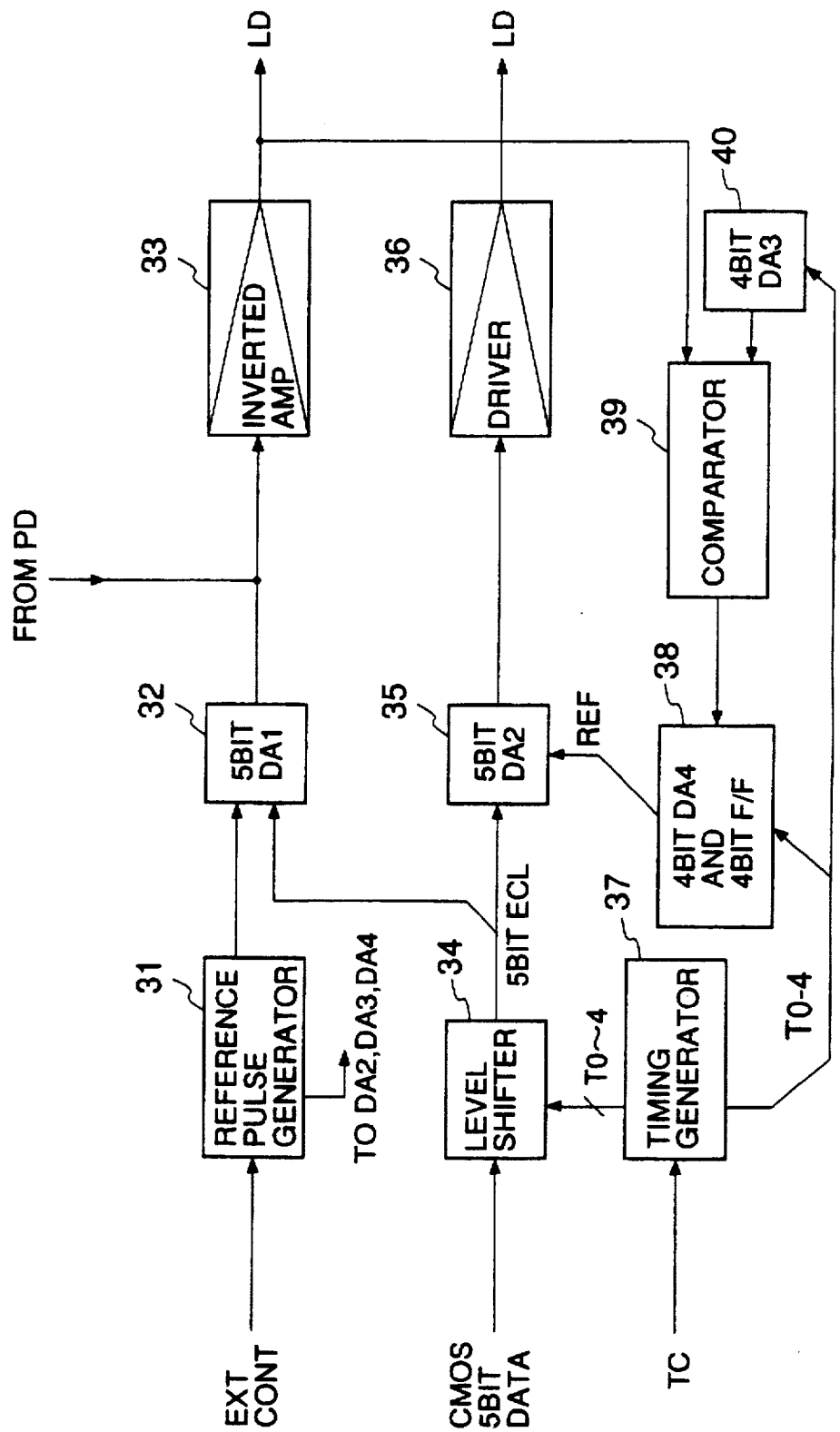
FIG. 19 shows a block diagram of an analog ASIC, including a linking function, in an embodiment of the present invention.

With reference to FIG. 19, a functional block diagram of an analog ASIC 2 in an embodiment of the present invention will now be described. The analog ASIC 1 shown in FIG. 19 has the above function (linking function) of relationally controlling the levels of DA1 and DA2. The analog ASIC 2 includes a reference pulse generator 31, a first digital to analog converter 32, an amplifier 33, a level shifter 34, a second digital to analog converter 35, a driver 36, a timing generator 37, a fourth digital to analog converter 38, a comparator 39, and a third digital to analog converter 40.

A timing generator 37 generates a pulse signal for causing the output-light intensity (light emission level) of the semiconductor laser to vary from the minimum level to the maximum level. That is, the timing generator 37 generates a series of pulses which are delayed by a predetermined time period. In each timing of the series of pulses, if the output current of the photoelectric negative feed-back loop corresponds to the minimum output-light intensity level, the digital to analog converters DA3 and DA4 control the output of the digital to analog converter DA2 so that the output current of the photoelectric negative feed-back loop may be identical to one corresponding to the maximum light intensity level.

Figure 20:
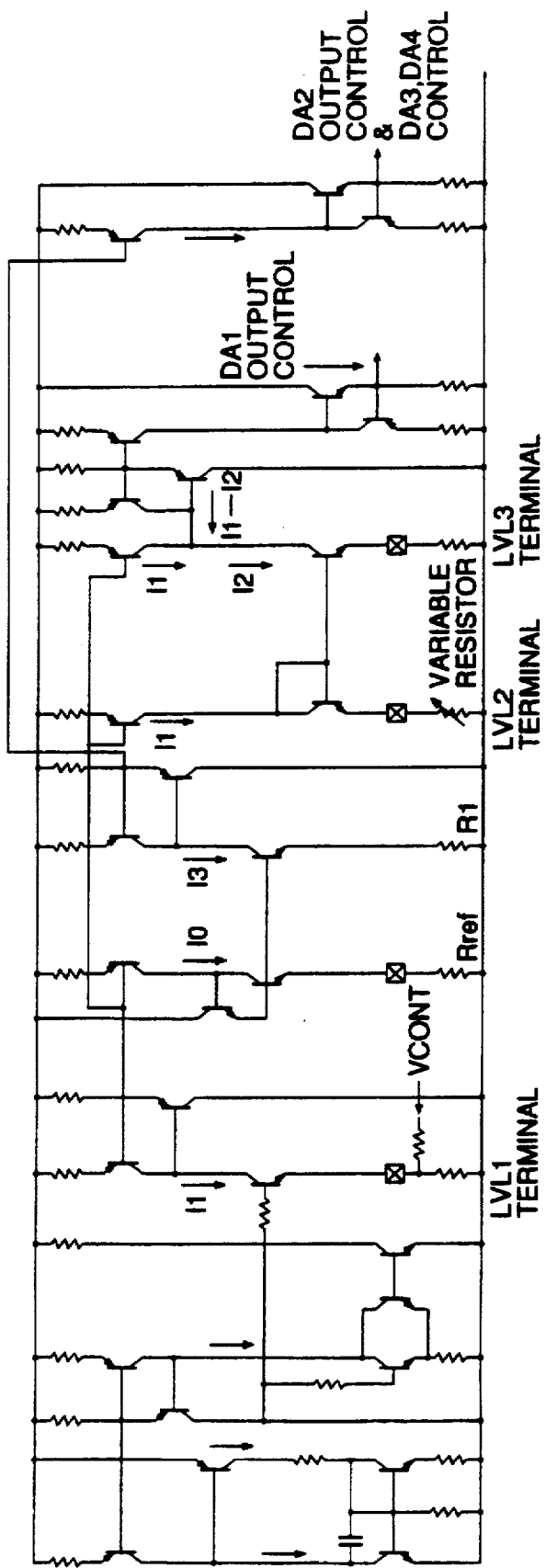
FIG. 20 shows a circuit diagram corresponding to the construction shown in FIG. 19.

FIG. 20 shows an example of a circuit construction of the block construction shown in FIG. 19 and will now be described.

As mentioned above with reference to FIGS. 16A through 16G, the fine light output level control can be achieved due to the linking of the DA1 and DA2 functions and also the DA3 and DA4 (shown in FIG. 19) functions can be used relationally in addition. Thus, the DA2 output level setting such as that shown in FIG. 17 can have a flexibility in the setting variation. If the DA2 level has been set according to the logic shown in FIG. 17 in the initializing process, output level reduction in the DA1 may cause degradation in the DA2 setting accuracy due to the number of bits which can be handled by the DA4. The above output level reduction may be carried out so as to correct the maximum light emission level appropriately to the printing-system characteristics as mentioned above with reference to FIGS. 16A, 16B and 16C. The reason of the above degradation will now be described. In an example, the output of the error amplifier is different between the case where the DA2 level is set for the middle of the pixel data region shown in FIGS. 16A, 16B and 16C and the case where the DA2 level is set for the end of the pixel data region. The output current level of the error amplifier varies together with the variation of the semiconductor-laser maximum light emission level. Thus, the output levels of the DA3 and DA4 set according to the output current level of the error amplifier vary simultaneously with the variation of the semiconductor-laser maximum light emission level. Thus, the DA2 level can be set in a fixed accuracy among various setting levels of the semiconductor-laser maximum light emission levels.

Figure 21:
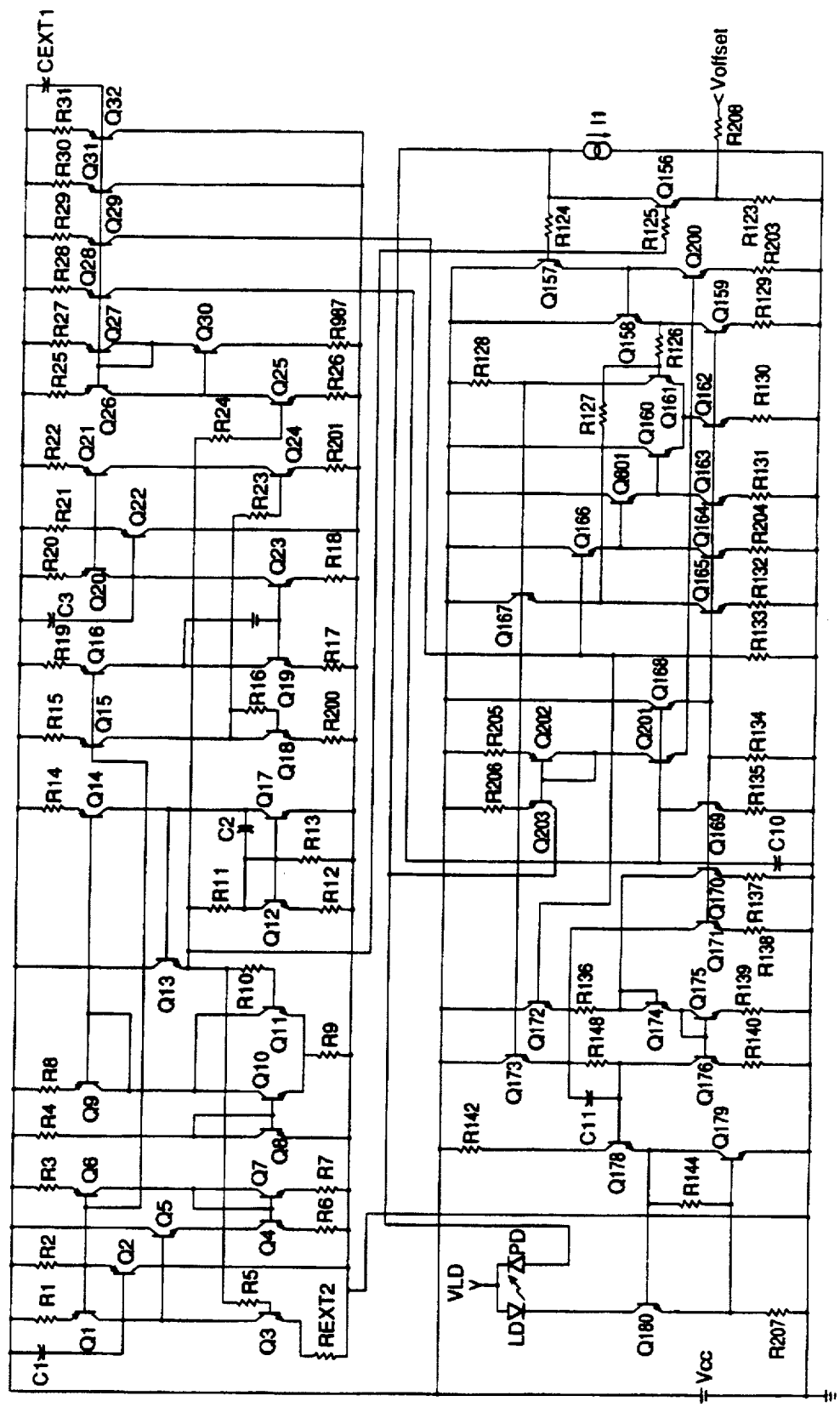
FIG. 21 shows a circuit diagram of a reference power-source generator and an error amplifier in the analog ASIC shown in FIG. 14.

FIG. 21 shows an example of circuit construction of the reference power-source generator and error amplifier in the analog ASIC 2 shown in FIG. 1. Outline of operations in the circuit construction will now be described.

The upper half of the construction is the reference power-source generator in which the emitter voltages of transistors Q3, Q25 and Q156 are the reference voltages determined depending on the emitter voltage of a transistor Q13. If the emitter voltage of Q25 is stable independent of the device parameters, temperature and so forth, it is possible to make the collector current flowing through Q25 constant by using a highly accurate resistor as a resistor R26, a stable constant current source being thus achieved. By forming the ASIC so that the emitter of Q25 is taken as an external terminal pin of the ASIC so that the resistor R26 will be provided as an external resistor of the ASIC, it is possible to provide R26 using a desirably accurate component. Thus, the stability of the constant current source may be improved desirably.

The collector current of Q25 provides the constant current into the ASIC using the current mirror circuits consisting of transistors Q25, Q27, Q28, Q29 and Q30. The current sources consisting of Q28 together with R28 and Q29 together with R29 are stable when they operate in the direct-current operation state. However, in order to make them also stable in the alternative-current operation state, it is necessary to provide a bypass capacitor between either the base of Q25 or the collector of Q26 and the power source Vcc. It is difficult in general to form a capacitor having a large capacitance with a miniaturized dimensions due to the inevitable characteristics of the device in such an ASIC. Thus, a capacitance of several tens pF may be obtained at the largest. However, although such a value of capacitance may be effective in controlling oscillation in a current mirror circuit, it may not be enough for removing a power-source noise or the like.

In order to solve this problem, the circuit construction in the embodiment of the present invention takes the base of Q26 as an external terminal pin of the ASIC. Thus, a capacitor CEXTI as shown in FIG. 21 will be provided as an external element of the ASIC. As a result, it is possible to select a desired large capacitance value, 0.01 µF or 0.1 µF, for example, as the capacitor CEXTI, which value is difficult to realize as the element within the ASIC. Further, it is also possible to increase the capacitance by adding a capacitor to the capacitor first connected to the ASIC. Thus, it is possible to improve the ASIC in stability against power-source voltage variation.

The lower half of the construction shown in FIG. 21 is the error amplifier including an inverted amplifier using the base of transistor Q157 as the input terminal thereof and also using the collector current of a transistor Q180 as its output current. The amplifier includes an open loop for controlling the output current of Q180 so that a current $I_1$ shown in the figure is identical to a current IPD flowing out from the PD. Further, the offset current generating circuit consisting of a transistor Q156 and a resistor R123 allows the appropriate offset current to flow through the PD. Since the emitter voltage of Q156 can be a stable one as mentioned above, it is possible to set a highly accurate offset current by providing an appropriate component such as the external resistor R123.

The coupling efficiency αS between the LD and PD is assumed as follows:

$$\alpha S = 0.2 \text{ (mA/mW)};$$

where α is the coupling coefficient between the LD and PD and S is a light reception emission sensitivity. Thus, when the LD outputs 1 mW, the current IPD is 200 µA. In the case where the real-time high-speed photoelectric negative feed-back loop is used as shown in the figure, it is not possible to switch the LD off completely. If the above offset current is set as 20 µA for example, the output of the LD is 100 µW due to the coupling efficiency αS between the LD and PD. Thus, the offset light emission is 100 µW.

The case where the following assumption is taken will now be described. The base current of Q200 is not supplied from the emitter of Q201 but is supplied from the common current source that supplies the base current of Q159 or Q162. Since Q200 and R203 supplies the collector current of Q157 Ic, the base current Ib of Q157 is obtained by the following equation where the current amplification factor is referred to as Hfe:

$$Ib = Ic/Hfe.$$

Concretely, if it is assumed that Ic=1 (mA), Hfe=100, Ib=10 (µA). Further, if it is assumed that amplification factors of transistors within the ASIC may vary for a large range such as that between 50 and 200 in general, the above base current Ib may vary for a range such as that between 5 µA and 20 µA among different products. Since Q157 supplies the input of the relevant photoelectric negative feed-back loop, the above variation range in the base current Ib corresponds to the range between 25 μW and 100 μW of the light output of the LD.

The reduction of the Q157 collector current may control the offset current of the LD, that is, control the offset light intensity, but should degrade the Q157 frequency characteristics simultaneously. Thus, this measure is not suitable to be applied to a photoelectric negative feed-back loop such as is required to have a high-speed operating capability.

In order to solve the problem, as shown in FIG. 21, the circuit construction is made so that the base current of Q200 is supplied by the emitter of Q201. Thus, the base current of Q200 is detected and the current is applied to the base of Q157, which supplies the input of the photoelectric negative feed-back loop, through the current mirror circuit consisting of Q202, Q203 and so forth. As a result, since the collector currents of Q157 and Q200 are approximately the same due the circuit construction, the current, the amount of which is identical to the base current of Q157, is supplied to the Q157 base from the Q203 collector. Thus, the influence due to the Q157 base can be canceled. Generally speaking, transistor characteristics are similar among transistors in the same device, i.e. the relative accuracy is good. Thus, in the circuit construction, the offset current of the LD hardly depends on the Q157 bypass current and it may be definitely set by only using the offset current supply circuit consisting of Q156 and R123. Thus, a high-speed and highly accurate photoelectric negative feed-back loop can be achieved.

Although it is assumed that the coupling efficiency between the LD and PD is fixed in the above consideration, the coupling efficiency may vary. The case where the coupling efficiency varies will now be described. It is assumed that the αS varies in a range between 0.1 and 0.3 (mA/mW). In this case, even if the offset current of the LD is fixed as 10 μA for example, the corresponding offset light intensity may vary in the range between 33.3 μW and 100 μW.

In order to solve the problem, it is possible to use means such as another external PD for monitoring the LD light output so that the voltage on a Voffset terminal shown in FIG. 21 is controlled using the output of the monitoring means. Thus, the offset light intensity may be made fixed as a desired-value one.

In an example, if it is assumed that the Q156 emitter voltage has the value of the stable 1 (V), R123 has the resistance of 100 (kΩ) and R208 has that of 200 (kΩ), Ioffset=10 (μA) where the terminal Voffset is open or 1 (V) voltage is applied thereto;

Ioffset=5 (μA) where 2 (V) voltage is applied to the terminal Voffset; and

Ioffset=15 (μA) where 0 (V) voltage is applied to the terminal Voffset. Thus, the offset current (Ioffset) may be set using the LD light output. The offset current is formed using the resistor R208 and the voltage application terminal Voffset in the above example shown in FIG. 21. However, it is also possible and effective for the same purpose if a variable resistor of the like will be used alternatively. Thus, it is possible to achieve a provision for controlling the LD light output level in an improved accuracy according to the above principle according to the present invention.

A circuit device such as that including a digital ASIC and an analog ASIC including LD light-output control function such as described above should also include an LD-PD unit such as that mentioned above. This is because an initializing operation is necessary to be performed to detect the LD differential quantum efficiency when the power source is switched on. Another reason is that it should be confirmed that the photoelectric negative feed-back loop is real-time. However, actual LD-PD units have characteristics such that the LD differential quantum efficiencies and LD-PD coupling efficiencies are different among the device products and the devices are likely to be damaged. Thus, even if an LD-PD unit is formed on the relevant substrate, it is difficult to stably perform operation confirmation, function examination and so forth.

Figure 22:
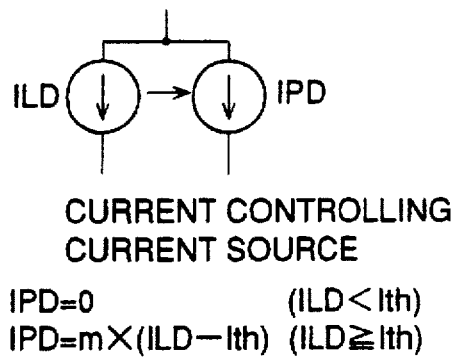
FIG. 22 shows a simulation unit for an LD-PD unit in an embodiment of the present invention.
Figure 23:
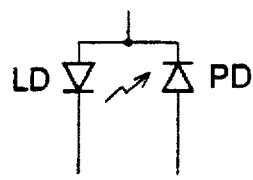
FIG. 23 shows an LD-PD in an embodiment of the present invention.
Figure 24:
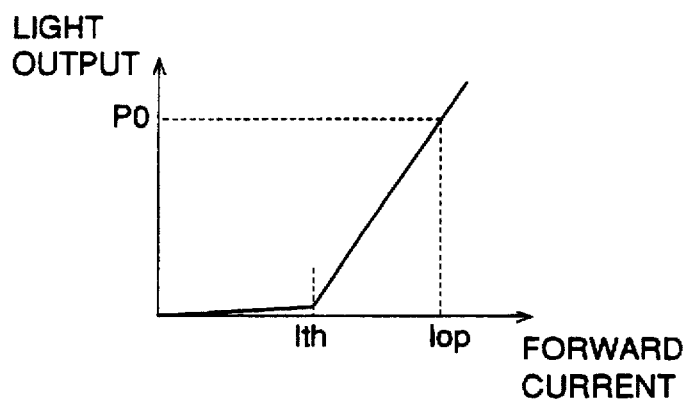
FIG. 24 shows LD-PD characteristics in an embodiment of the present invention.

In order to solve the problem, a simulation unit shown in FIG. 22 will now be considered. Generally speaking, an LD-PD such as that represented by FIG. 23 has characteristics such as those shown in FIG. 24. In a current controlling current source shown in FIG. 22, it is assumed that:

| IPD = 0 | (ILD < Ith); and |
| IPD = mx | (ILD ≈ Ith); | where m is the coupling coefficient between the ILD and IPD, and Ith is a threshold current value as shown in FIG. 24. In this case, it is possible to simulate the characteristics shown in FIG. 24.

Figure 25:
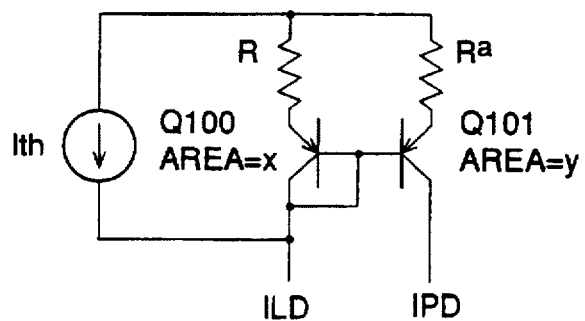
FIGS. 25 and 26 show circuit diagrams corresponding to the construction shown in FIG. 22.
Figure 26:
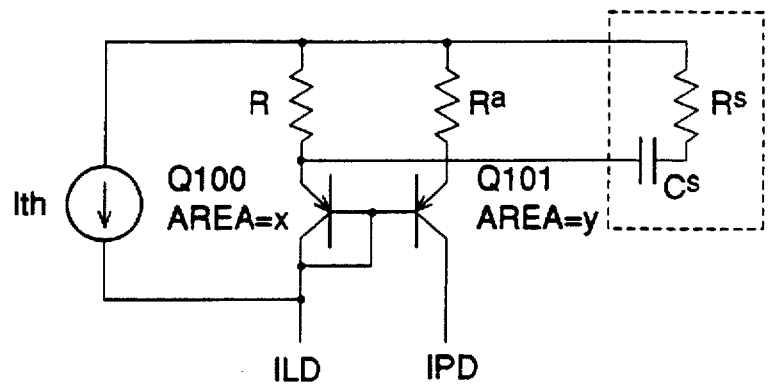

Concrete examples are shown in FIGS. 25 and 26. In the example shown in FIG. 25, if it is assumed that m=0.05 and Q100 and Q101 are transistors having the same characteristics, then, $R^a$ is set as 20R;

$x/y$ is set as 20;

and a current source Ith shown in FIG. 25 supplies the current of the value Ith. Thus, it is possible to produce a simulation unit of the LD-PD unit. The circuit construction shown in FIG. 25 as the simulation unit operates as if the circuit construction were the LD-PD unit in which the LD has the Ith and the product Eff·α·S of the differential quantum efficiency Eff, the PD-LD coupling efficiency α, and the PD light reception emission sensitivity S is $Eff·α·S=0.05$.

Such a simulation unit may be used for LD-PD units having any ILD-IPD coupling coefficients and/or any threshold current values Ith. Thus, use of such a simulation unit facilitates operation confirmation and/or function examination of a substrate having an LD light output control function such as described above.

If a PD-LD coupling coefficient has frequency characteristics such as that in which there is a first-order pole at a frequency, the characteristics may be canceled by providing provision such as a series circuit consisting of Cs and Rs shown in FIG. 26 having the same frequency characteristics. Similarly, if an n-th-order pole is present in the frequency characteristics of PD-LD coupling coefficient, it is also possible to simulate the same frequency characteristics using resistors and capacitors so as to cancel them.

A case will now be considered where the circuit device including a digital ASIC and a analog ASIC having an LD light output control function such as that shown in FIG. 1 is supplied with the power source. A provision is necessary to be provided for forcibly making the low state of the output data DOUT 0 through DOUT 4 of a digital ASIC 1 such as that shown in FIGS. 10 and 11 using an external signal.

Further, an analog Vcc as the power source voltage for the analog ASIC 2 coupled to the digital ASIC 1 is used to control the external signal so that the output of the digital ASIC 1 becomes the low state even if the analog Vcc is switched off so that the analog ASIC 2 is switched off while the digital ASIC is maintained in its switched on state. Thus, a leaked current should be prevented from appearing at the analog ASIC 2 and/or the LD-PD unit. Thus, it can be prevented that the LD is switched on even if the analog Vcc is switched off.

Figure 27:
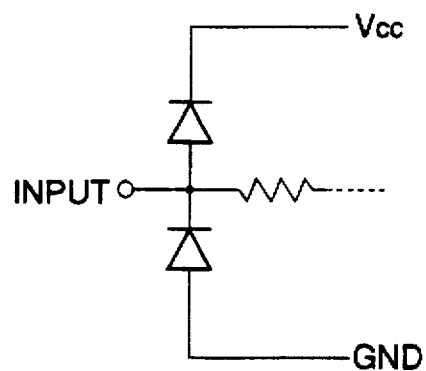
FIG. 27 shows an IC input protection circuit embodiment of the present invention.

However, generally speaking, in CMOS devices, approximately 2.5 V is used as a voltage to determine the logical value of a signal level between High and Low. Even though an analog Vcc is switched off, it may be a case where the analog Vcc maintains a voltage higher than 2.5 V. The reason of this phenomenon is as follows: The input protection unit of an ASIC has a construction such as that shown in FIG. 27 in general. In this construction, if the input terminal has the voltage of 5 V indicating the logic High, Vcc has been switched off, and also it is assumed that the voltage drop in the diode is 0.7 V, the Vcc has the voltage, the source of which is the above input terminal voltage 5 V and transferred via the diode, obtained by the following equation:

$$5-0.7=4.3 \text{ (V)}.$$

Thus, the Vcc has the voltage 4.3 V which is not lower than the above voltage 2.5 for the logical level determination. Such a phenomenon may cause the problem even though the function such as mentioned above is provided. The function is that for forcibly switching off the output of the digital ASIC by detecting the off state of the analog Vcc. The problem is that in which the LD is switched on even if the analog Vcc has been switched off because the logical High level of Vcc cannot prevent the digital ASIC coupled to the analog ASIC from giving a leak current to the analog ASIC and/or the relevant LD-PD unit.

Figure 28:
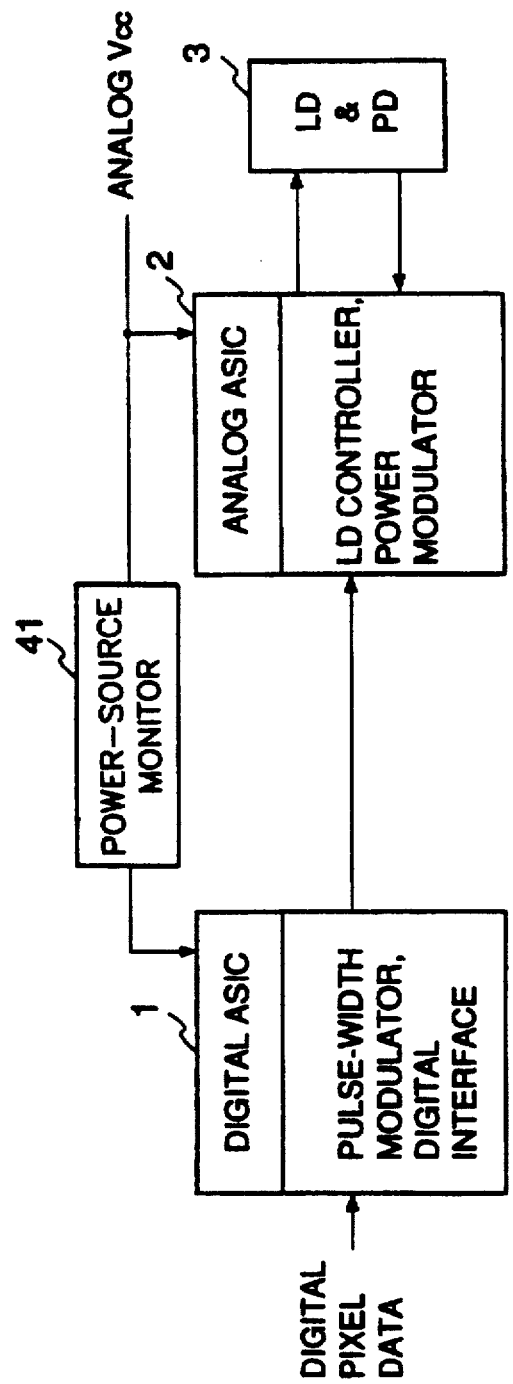
FIGS. 28, 29 and 30 show general block diagrams of image forming systems in other embodiments of the present invention.
Figure 29:
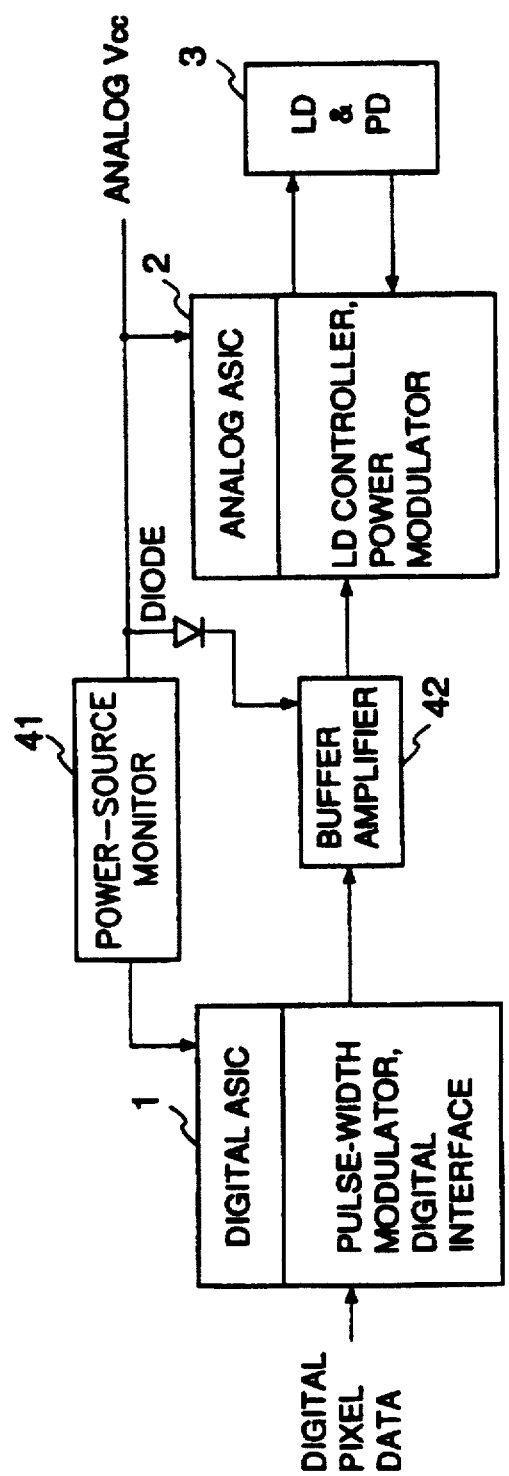

In order to prevent such a problem, image forming systems in embodiments of the present invention have block constructions shown in FIGS. 28 and 29. In the figures, the systems have power-source monitors 41, and a buffer amplifier 42. In the figures, the same reference numerals are given to blocks having functions same as those of the blocks shown in FIG. 1

As shown in FIG. 28, the power-source monitor 41 supplies a signal to an output controlling pin of the digital ASIC 1 for forcibly switching off the output of the digital ASIC if the analog Vcc has been switched off. In an example, the power-source monitor 41 may have a function of supplying the voltage of 5 V indicating the High logical value if the analog Vcc has a voltage more than 4.5 V and supplying the voltage 0 V indicating the Low logical value if the analog Vcc has a voltage less than 4.5 V. Thus, if the analog Vcc has been switched off, the output of the digital ASIC is automatically made to have the Low logical values. As a result, a phenomenon such as that described with reference to FIG. 27 in which the analog Vcc has the voltage having the High logical value can be prevented. Thus, the LD being switched on even though the analog Vcc has been switched off can be prevented.

Further, it may be the case where the set voltage which the above power-source monitor 41 monitors is not 4.5 V as mentioned above but is 4 V. In this case, the block construction shown in FIG. 29 is effective. In the figure, the output of the digital ASIC is input to the analog ASIC 2 via a buffer amplifier 42 and the power source of the buffer amplifier 42 is supplied by the analog Vcc via a diode as shown in the figure. In this construction, a case is assumed that the output of the digital ASIC has a voltage of the logical High after the analog Vcc has been switched off. In such a case, a leak current, such as that flowing through the diode from the input terminal to the analog Vcc in the construction shown in FIG. 27, flows through both the diode in the input protection unit (not shown in FIG. 29) such as that shown in FIG. 27 and the above diode provided between the analog Vcc and the buffer amplifier before arriving at the analog Vcc. Thus, if it is assumed that the voltage drop appearing at each diode is 0.7 V (same as that mentioned above), the voltage of the analog Vcc in the case is obtained by the following equation:

$$5-0.7-0.7=3.6 \text{ (V)}.$$

The analog Vcc in this case is thus 3.6 V less than the set voltage 4 V in the monitor 41. Thus, the problematic phenomenon in that the LD is switched on even though the analog Vcc has been switched off can be prevented.

Figure 30:
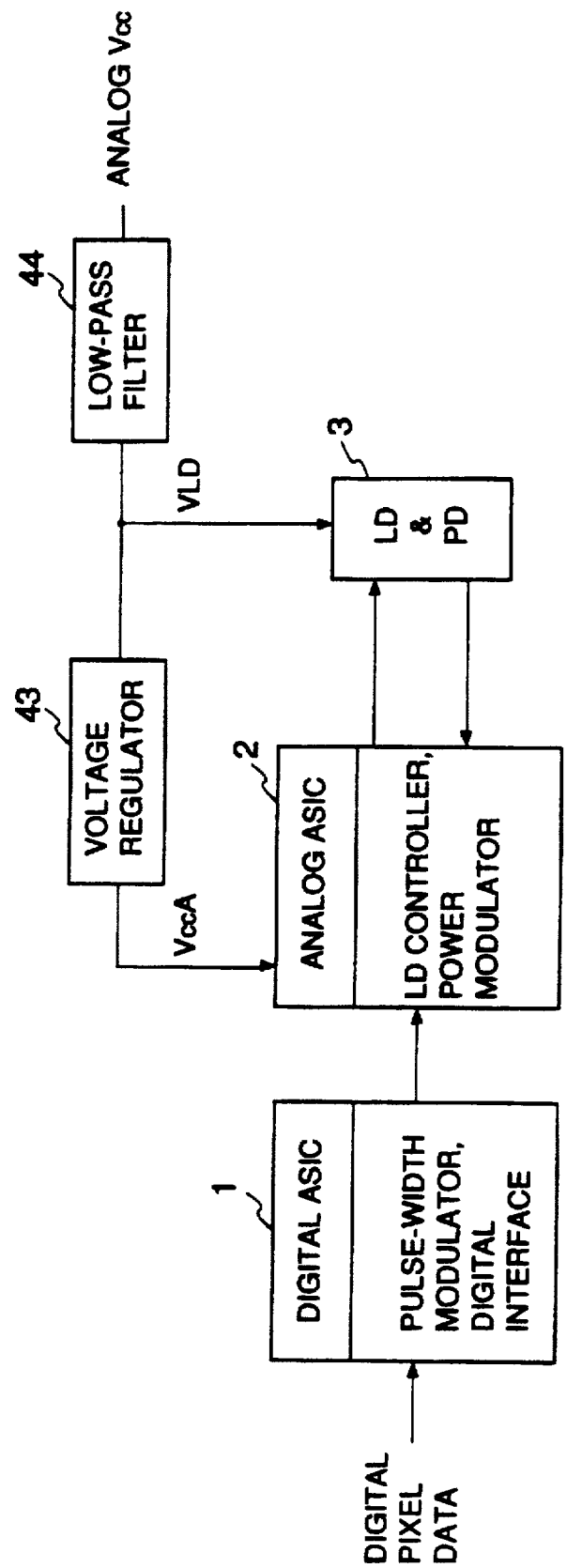

An image forming system in another embodiment of the present invention will now be described with reference to FIG. 30. The system includes a voltage regulator 43 and a low-pass filter 44. In the figure, the same reference numerals are given to blocks having functions the same as those of the blocks shown in FIG. 1.

Ordinarily, a common power source is used by both a semiconductor laser LD and an analog ASIC for controlling the light output of the LD. In this construction, a start-up unit is provided in the analog ASIC, which unit has a function of switching off the LD light output when the power source is switched on. However, there may be a case where it is necessary to provide two power sources, having different voltages, for the LD and the analog ASIC 2. This is because in general the PD frequency characteristics improve as the power source of the PD, that is, the inverse bias voltage of the PD, increases in voltage. Another reason is that power consumption of the analog ASIC 2 may be reduced as the power-source voltage is reduced. If the provision of the separate voltage sources is necessary, as shown in FIG. 30, the analog ASIC 2 is supplied with the power-source voltage VccA from the VLD (power-source voltage for the LD) via the voltage regulator 43. However in this construction, the starting up speeds when the power source Vcc is switched on are different between the analog Vcc and the above VccA. Since the VccA starts up via the voltage regulator 43, the VccA starts up slower than the Vcc.

In order to eliminate a starting-up speed difference, the power source is supplied to the VLD and the voltage regulator 43 via the low-pass filter 44 having a function of delaying the power-source voltage starting-up operation sufficiently so that the times (rise times) required for starting up the power-source voltages may be identical between the VLD and VccA. Thus, a problematic phenomenon may be prevented, for example, in which the LD light output is unexpectedly switched on when the power source has been switched on, even if the separate power sources are provided for the LD and the analog ASIC 2. As a result, it is possible to achieve a safe and high-performance LD light-output control unit.

An image forming system in another embodiment of the present invention will now be described with reference to FIG. 31. The system includes a filter 45. In the figure, the same reference numerals are given to blocks having functions the same as those of the blocks shown in FIG. 1.

In the LD light-output control unit shown in FIG. 1, if the LD has the characteristics shown in FIG. 24, a current expressed by the following equation:

$I = I_{op} - I_{th}$ transitionally flows due to the relevant input data. Such a current, having a value in a range between 20 mA and 50 mA, ordinarily depending on particular LDs, is switched on/off in the operation speed of the IDA2 of FIG. 15 such as a rise time/decay time having a value in a range between 1 ns and 3 ns for example. Further, when the digital pixel data is input to the digital ASIC 2, the voltage, such as that having a value in a range between 0 and 5 V, in the data is switched on/off in the similar rise time/decay time, a similar phenomenon also occurs when the relevant signal is input to the analog ASIC 2 from the digital ASIC 1. Such a phenomenon may cause high-frequency noise in the LD light output and/or in the photoelectric negative feed-back loop.

Figure 31:
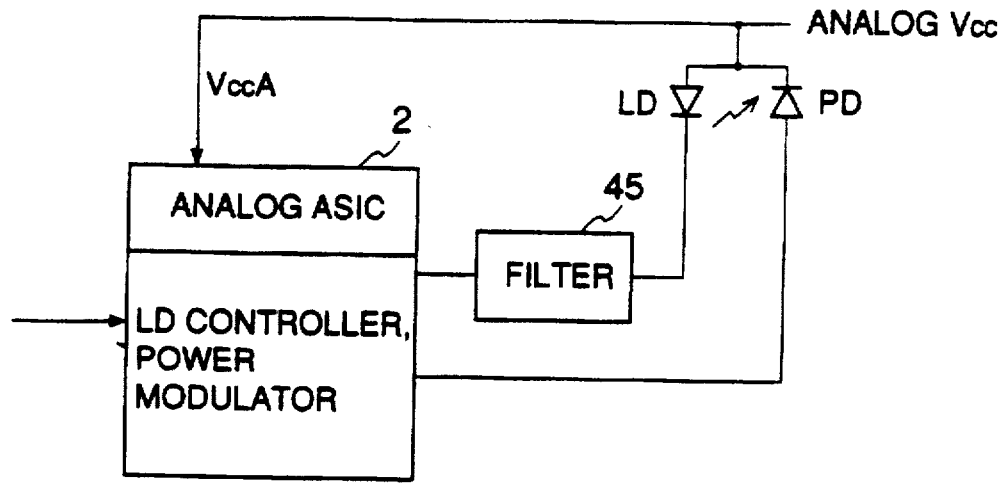
FIGS. 31, 32, 33, 34, 35 and 37 show general block diagrams of analog ASICs and peripheral constructions in other embodiments of the present invention.
Figure 32:
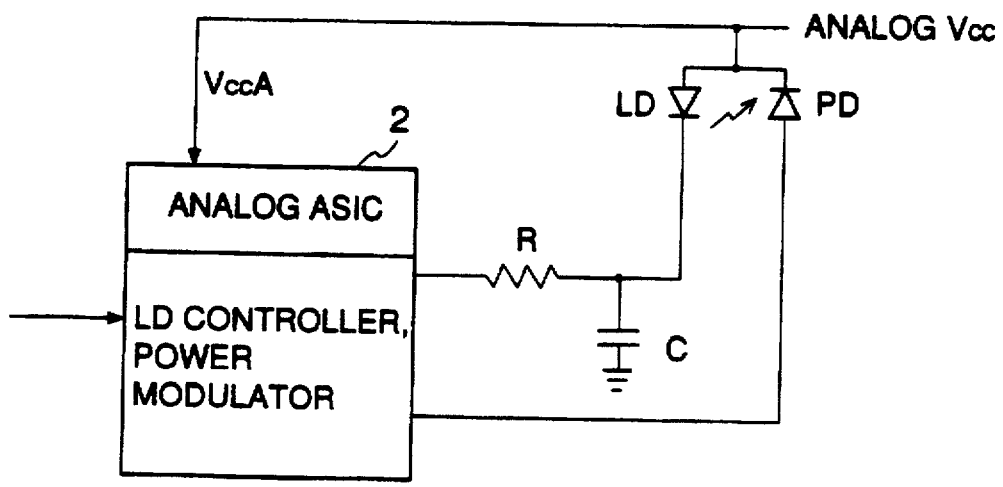
Figure 33:
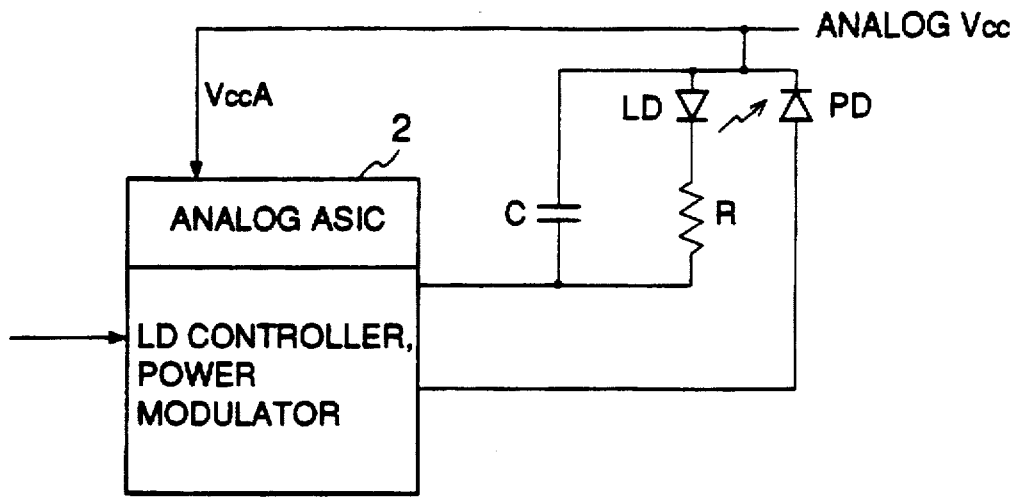

In order to eliminate the noise appearance, the low-pass of band-pass filter 45 is provided in the photoelectric negative feed-back loop as shown in FIG. 31. Thus, the high-frequency noise is filtered so that an output light having a better waveform may be obtained. As shown in FIG. 32, a first-order low-pass filter consisting of a resistor R and a capacitor C is applied as the filter 45 in FIG. 31. The filter 45 is formed to have a cut-off frequency higher than the cut-off frequency of the relevant photoelectric negative feed-back loop. Thus, frequency components having frequencies higher than the cut-off frequency of the filter 45 are reduced in the poles of the second order, or more than the second order, the high-frequency noise being thus reduced. Similarly, the similar advantage may be obtained if a low-pass filter is provided directly for the current flowing through the LD as shown in FIG. 33.

Figure 34:
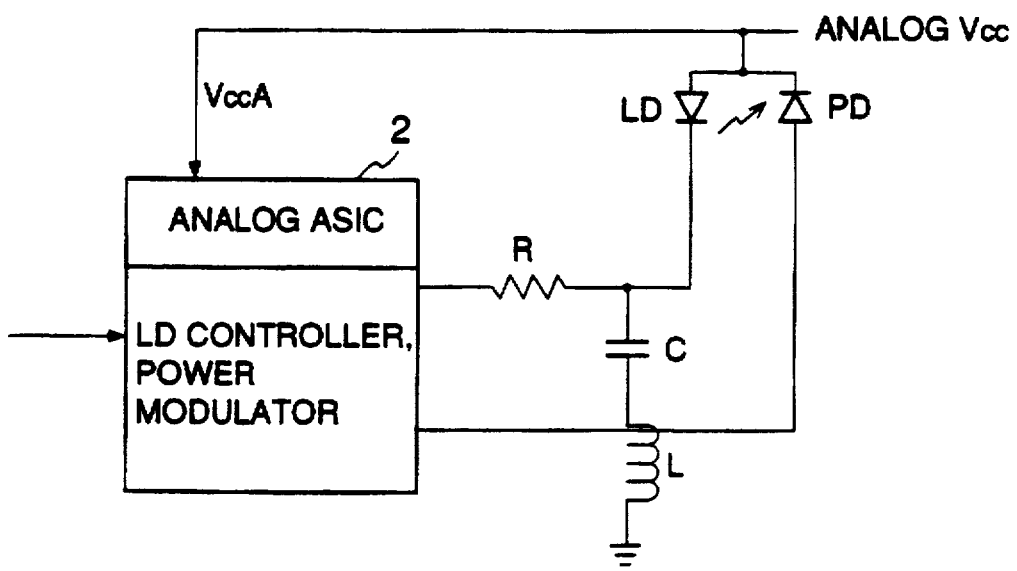

Further, it is also possible to cut off a particular frequency f using a capacitor C and an inductance L as shown in FIG. 34. Frequency f may be expressed by the following equation:

$$f = 1/2\pi LC.$$

If it is assumed that C=30 (pF) and L=30 (nH) for example, f is 168 (MHz). Thus, the noise near the frequency f may be reduced. Such an inductance L may be provided not only by using a separate inductance device but also by using an inductance produced by appropriately determining the positions of elements on the relevant substrate. Generally speaking, a signal wire has an inductance 1 nH per 1 mm for example. In this case, the above L=30 (nH) may be obtained by a simple signal wire having the length of 30 mm.

Figure 35:
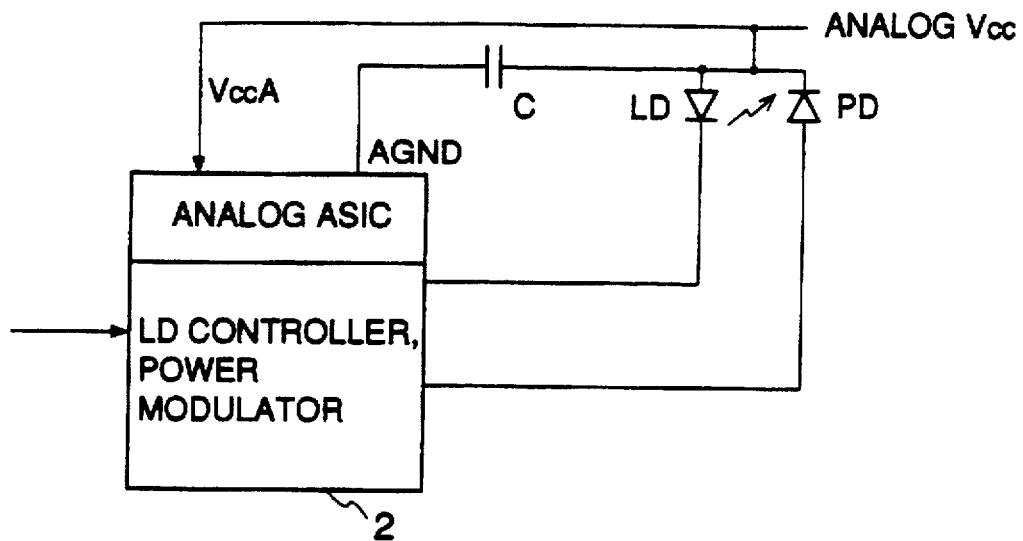

A case will now be described in which a pass capacitor C is provided between the LD power source and the analog-ASIC ground AGND as shown in FIG. 35. In this case it is necessary to consider the influence due to the capacitor lead wire length and signal wire length. A simple example will now be considered. In this example, a signal having a rise time/decay time of 2 nS causes a high frequency noise. The rise time/decay time are assumed to be ones required for varying the level between 10% and 90%. Thus, the relevant cut-off frequency f may be obtained by the following equation:

$$f = 1/\pi\tau;$$

where $2.2\tau=2$ (nS). Thus, f=175 (MHz). If the total of the pass-capacitor lead wire length and the relevant signal wire length is 10 mm, assuming that the inductance produced thereby is 10 nH, the impedance ZL appearing at this frequency f may be obtained by the following equation:

$$|ZL| = 2\pi fL = 11 \text{ } (\Omega).$$

Thus, even though the total wire length is short such as 10 mm as mentioned above, it may not be said, due to a significant impedance such as 11 Ω as mentioned above, that the pass capacitor performs its function sufficiently.

Figure 36:
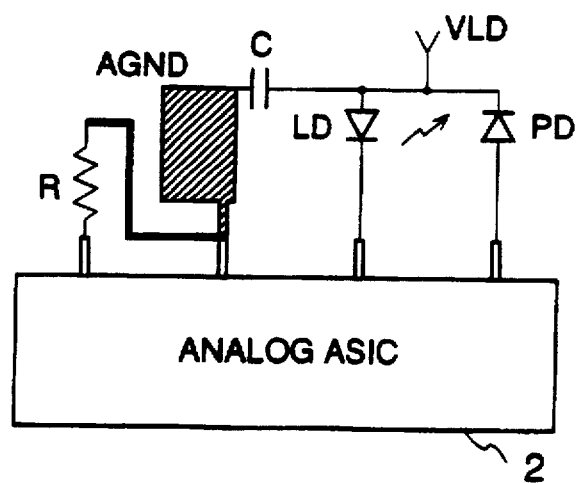
FIG. 36 shows a substrate layout diagram of an analog ASIC in an embodiment of the present invention.

In order to solve this problem, it is necessary to reduce such an impedance. A substrate layout shown in FIG. 36 in an embodiment of the present invention can achieve the purpose. In order to reduce the inductance due to the signal wire length, the AGND is necessary to be formed as to be a thick and wide one. Further, it is necessary to provide the pass capacitor C so as to connect between the VLD and the AGND with a distance therebetween shortest as short as possible. Further, the pass capacitor C should be not one having lead wires but should be one of the chip type.

Figure 37:
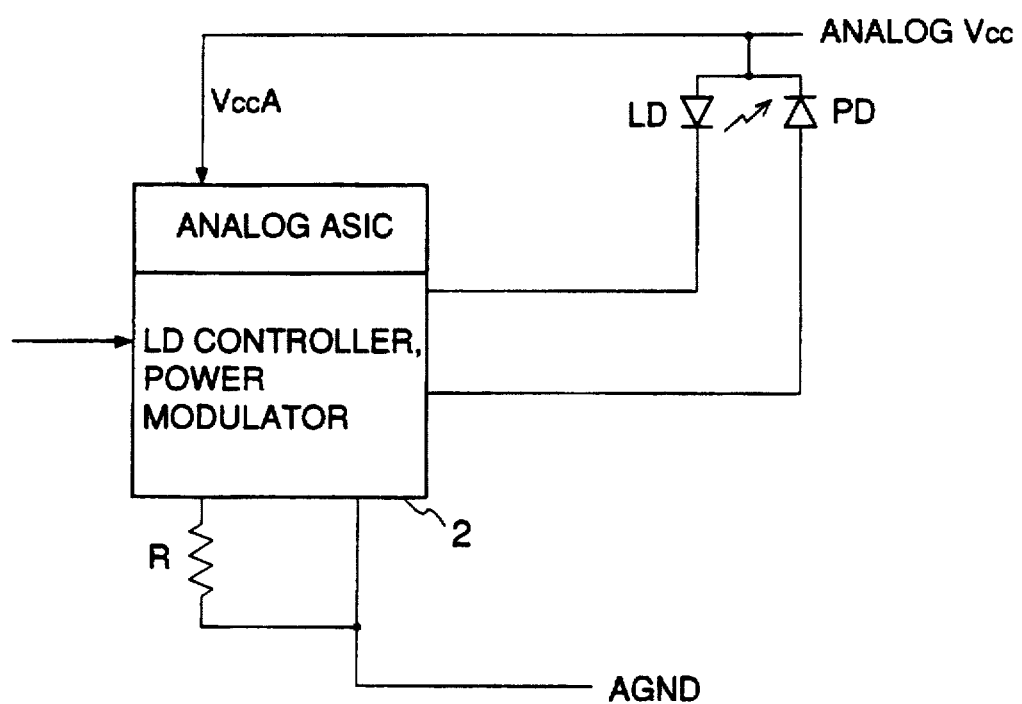

Further, a condition, which is necessary to prevent such noise from occurring, in a case where an external resistor is provided for generating the reference current of the analog ASIC will now be described. R26 or R123 shown in FIG. 21 may be the above external resistor. Such an external resistor is typically shown as R in FIGS. 36 and 37. This resistor R should be connected to the real AGND of the analog ASIC. That is, the substrate layout is made such as that shown in FIG. 36 so that no circuit should be provided in the relevant portion, which circuit acts to absorb an extra current and/or high-frequency noise. Thus, the reference current in the analog ASIC 2 can be a stable one. As a result, it can be achieved to provide an LD light output control substrate which is stable and is hardly influenced from noise and so forth.

In an experiment, we have realized an image forming system in an embodiment of the present invention including an analog ASIC 2 and digital ASIC 1 such as those described above. The realized system is formed as a module of a substrate having the size of 65 (mm)×38.5 (mm). This system is suitable to be applied to a laser printer and uses a semiconductor-laser control/modulation method using a photoelectric negative feed-back loop which has a capability of modulating the light output at high speed. It has been confirmed that this system operates in a condition where the laser-printer printing clock is one of 25 MHz. Further, by using the system, it is possible to simply miniaturize a printing system in a laser printer, which system has a capability of half-tone printing without degradation in image resolution/fineness.

Further, the present invention is not limited to the above described embodiments, and variations and modifications may be made without departing from the scope of the present invention.

What is claimed is:

1. An image forming system for forming an image comprising respective pixels, comprising:

a semiconductor laser for emitting light as a light output;

a digital ASIC responsive to pixel data representing said respective pixels and comprising a pulse width modulator which modulates a pulse width and generates a pulse width modulation output signal in accordance with said pixel data; and an analog ASIC responsive to said pulse width modulation output signal of said digital ASIC and comprising a power modulator which modulates a pulse amplitude so as to generate a modulated laser control signal for said semiconductor laser;

wherein the pulse width modulation output signal of said digital ASIC and the laser control signal of said analog ASIC control said semiconductor laser so as to pulsewidth-modulate and amplitude-modulate the light emitted by said semiconductor laser that may be pulse-width-modulated and amplitude-modulated.

2. The image forming system according to claim 1, wherein:

said digital ASIC comprises a reference pulse generator which outputs reference pulses having a plurality of phases and a pulse width generator for generating a plurality of different pulse widths using said reference pulses generated by said reference pulse generator; and said analog ASIC comprises a controller and power modulator which controls said semiconductor laser so as to pulse-width-modulate and amplitude-modulate the light emitted by said semiconductor laser using the plurality of different pulse widths generated by said pulse width generator.

3. The image forming system according to claim 2, wherein said reference pulse generator comprises:

an oscillator comprising a plurality of inverters connected in series; and a control circuit which controls said oscillator so as to make the frequency supplied by said oscillator identical to a clock of the pixel data.

4. The image forming system according to claim 1, wherein said digital ASIC comprises:

a pulse width generator which generates a plurality of pulse widths using pulses, having a plurality of phases, generated by a reference pulse generator; and a control circuit which changes output timings of pulses, included in the pulse width modulation output signal, with respect to clocks of the pixel data, and wherein:

said digital ASIC receives the pixel data and a position control signal as its input data and outputs the pulse width modulation output signal indicating pulse-width modulation instructions, pulse amplitude modulation instructions and pulse generating timings;

the pulse amplitude modulation instructions represented by the pulse width modulation output signal of said digital ASIC defines the amplitude of the light emitted by said semiconductor laser, the pulse-width modulation instructions represented by said pulse width modulation output signal defines a pulse width of the light emitted by said semiconductor laser, and the pulse generating timings represented by said pulse width modulation output signal defines a light emission timing of said semiconductor laser.

5. The image forming system according to claim 4, wherein:

said digital ASIC is a single chip including both said pulse width generator and a conversion table for converting the linearity of the pixel data; and said analog ASIC is another single chip including a controller and power modulator which controls said semiconductor laser so as to pulse-width-modulate and amplitude-modulate the light emitter by said semiconductor laser using the plurality of pulse widths generated by said pulse width generator.

6. The image forming system according to claim 5, wherein:

said digital ASIC is formed of CMOS transistor technology; and said analog ASIC is formed of bipolar transistor technology.

7. The image forming system according to claim 2, wherein said pulse width generator generates two pulses having different widths using most significant bits of the pixel data for each respective pixel and then generates respective pixel pulses corresponding to least significant bits of said pixel data for each respective pixel using said two pulses having different widths, the difference in width between said two pulses corresponding to a portion of each of said respective pixel pulses, an amplitude of said portion being amplitude-modulated.

8. The image forming system according to claim 7, wherein said difference in width between said two pulses having different widths is equal to a unit of delay time supplied by said reference pulse generator.

9. The image forming system according to claim 8, further comprising:

a PWM circuit which forms a continuous pixel pulse from two of said respective pixel pulses obtained by the pulse-width-modulation and amplitude-modulation for adjacent two pixels of the pixel data by shifting phases of said two respective pixel pulses; and an addition control circuit which processes a portion of each of said two respective pixel pulses, the portion for said two respective pixel pulses defining two portions, each of said two portions corresponding to said difference in width, so that said continuous pixel pulse formed by said PWM circuit has a single portion corresponding to said difference in width.

10. The image forming system according to claim 9, wherein said addition control circuit adds a smaller amplitude of two amplitudes of said two portions to a larger amplitude of said two amplitudes of said two portions; and if the result of the addition exceeds the amplitude of remaining portions of said pixel pulses other than said two portions, the two amplitudes of said two portions being controlled so that a one of said two portions originally having the smaller amplitude has a surplus amplitude and a one of said two portions originally having the larger amplitude has an equal amplitude value as that of said remaining portions.

11. The image forming system according to claim 10, further comprising a position control circuit which selects, using position control data input to said system other than the pixel data, one of four modes consisting of three modes for determining a position, from which a width of a pixel pulse extends in a time axis direction, to be a starting position, a middle position and a last position of a clock period of the pixel data, and one mode for processing said two portions of said two pixel pulses, each of said two portions corresponding to said difference in width, so that said continuous pixel pulse formed by said PWM circuit has a single portion corresponding to said difference in width.

12. The image forming system according to claim 11, comprising a command control circuit which switches, according to the position control data, a table into a different table so as to obtain a table appropriate to said position control data, said table being used to convert a linearity of the pixel data so as to obtain a converted linearity of said pixel data appropriate to printing system characteristics.

13. The image forming system according to claim 2, wherein said controller and power modulator further comprises:

a photosensitive element for monitoring the light output of said semiconductor laser and generating a monitor output signal;

an inverted amplifier which inverts and amplifies a difference in level between the monitor output signal of said photosensitive element and a light emission instruction signal which controls a light emission level of said semiconductor laser, said inverted amplifier then driving said semiconductor laser; and a current source which cancels an offset current of said inverted amplifier.

14. The image forming system according to claim 11, wherein said controller and power modulator further comprises:

a photosensitive element for monitoring the light output of said semiconductor laser and generating a monitor output signal;

an inverted amplifier, formed of a bipolar transistor device, which inverts and amplifies a difference in level between the monitor output signal of said photosensitive element and a light emission instruction signal which controls a light emission level of said semiconductor laser, said inverted amplifier then driving said semiconductor laser; and a current source which cancels an offset current of said inverted amplifier.

15. The image forming system according to claim 13, wherein said current source uses a current mirror circuit for producing a current equal to a base current of a transistor which carries a current therethrough equal to an emitter current of an input transistor of said inverted amplifier, a generated current being then added to a base of said input transistor.

16. The image forming system according to claim 2, wherein said controller and power modulator further comprises:

a photosensitive element for monitoring the light output of said semiconductor laser and generating a monitor output signal;

an inverted amplifier which inverted amplifies a difference in level between the monitor output signal of said photosensitive element and a light emission instruction signal which controls a light emission level of said semiconductor laser, said inverted amplifier then generating an inverted amplifier output signal for driving said semiconductor laser;

a current detector for detecting a variation amount in the inverted amplifier output signal of said inverted amplifier, the variation amount depending on the light emission instruction signal, said current detector generating a variation amount signal based upon the variation amount;

a first digital to analog converter for converting pixel data to said controller and power modulator into a first corresponding analog data signal;

a comparator for comparing the variation amount signal of said current detector with the first corresponding analog data signal of said first digital to analog converter in an initializing process, said comparator generating a comparator signal;

a retaining circuit which retains, in a predetermined timing, said comparator signal;

a timing generator for generating said predetermined timing in said initializing process;

a second digital to analog converter for converting pixel data to said controller and power modulator into a second corresponding analog data signal based upon said comparator signal stored in said retaining circuit;

a current adder for outputting a current having an amplitude proportional to that of said light emission instruction signal, a proportion coefficient being determined using the second corresponding analog data signal of said second digital to analog converter; and a full-scale corrector which corrects a full-scale value of the first corresponding analog data signal of said first digital to analog converter together with correction of said light emission instruction signal full-scale value, said correction of said light emission instruction signal being performed so as to make said signal match characteristics of an image printing system.

17. The image forming system according to claim 16, wherein said full-scale corrector also corrects the full-scale value of the second corresponding analog data signal of said second digital to analog converter together with correction of said light emission instruction signal full-scale value and correction of the full-scale first corresponding analog data signal of said first digital to analog converter.

18. The image forming system according to claim 5, wherein said controller and power modulator further comprises:

a photosensitive element for monitoring the light output of said semiconductor laser and generating a monitor output signal;

an inverted amplifier, formed of a bipolar transistor device, which inverts and amplifies a difference in level between the monitor output signal of said photosensitive element and a light emission instruction signal which controls a light emission level of said semiconductor laser, said inverted amplifier then driving said semiconductor laser;

a current source which cancels an offset current of said inverted amplifier; and a current controlling current source which sets an amount of said offset current using a voltage externally supplied through a resistor connected to said analog ASIC.

19. The image forming system according to claim 5, further comprising:

a monitoring circuit which monitors a power source voltage of said analog ASIC, said monitoring circuit generating a monitoring output signal based upon said monitored power source voltage; and a switching circuit which forcibly switches off the output of said digital ASIC according to the monitoring output signal of said monitoring circuit.

20. The image forming system according to claim 19, wherein a power source of said semiconductor laser is also used as the power source for said analog ASIC through a voltage regulator and also a low-pass filter is provided at an input of said voltage regulator.

21. The image forming system according to claim 5, wherein said controller and power modulator further comprises:

a photosensitive element for monitoring the light output of said semiconductor laser and generating a monitor output signal;

an inverted amplifier, formed of a bipolar transistor device, which inverts and amplifies a difference in level between the monitor output signal of said photosensitive element and a light emission instruction signal which controls a light emission level of said semiconductor laser, said inverted amplifier then driving said semiconductor laser; and a resonance circuit, provided between an output terminal of said inverted amplifier and said semiconductor laser, including a capacitor and an inductance formed by a lead of said capacitor.

22. The image forming system according to claim 16, wherein said controller and power modulator further comprises an amplitude correcting circuit which corrects an amplitude of said second corresponding analog data signal of said second digital to analog converter based upon an additional signal supplied by an external device.

23. A half-tone pixel representing method comprising the steps of:

a) controlling a width of a pulse according to pixel data representing respective pixels so as to control a tone of each respective pixel generally; and b) controlling an amplitude of a partial-width portion of said pulse, the amplitude of a remaining-width portion of said pulse being predetermined, according to said pixel data, so as to finely control said tone of each respective pixel.

24. The half-tone pixel representing method according to claim 23, wherein the predetermined amplitude of said remaining-width portion of said pulse is equal to or larger than the amplitude of said partial-width portion of said pulse.

25. The half-tone pixel representing method according to claim 23, wherein an entire area under said pulse determines the tone of each respective pixel, said entire area of said pulse being obtained by adding said partial-width portion and said remaining-width portion, each portion being obtained by multiplying a width and an amplitude.

26. The half-tone pixel representing method according to claim 23, further comprising the steps of c) making two adjacent pulses, each having been produced by said steps a) and b), approach one another by shifting a phase of at least one of said two adjacent pulses so that said two adjacent pulses constitute a combined pulse having two partial-width portions, of said two adjacent pulses, located at both sides thereof; and d) moving a smaller-amplitude partial-width portion to a top of a larger amplitude partial-width portion for generating a combined amplitude, and if the combined amplitude exceeds an amplitude of said remaining-width portion, a surplus amplitude is returned to a position at which the smaller-amplitude partial-width portion was originally located.

* * * * *